March 3, 1970    SVEN-OLOF KRONOGARD ET AL    3,498,057
GAS TURBINE POWER PLANT
Filed Oct. 4, 1967                             26 Sheets-Sheet 1
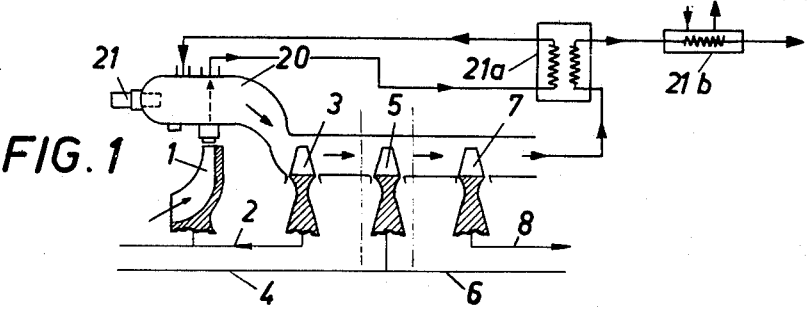
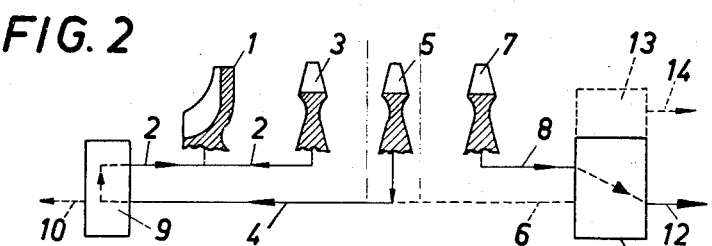
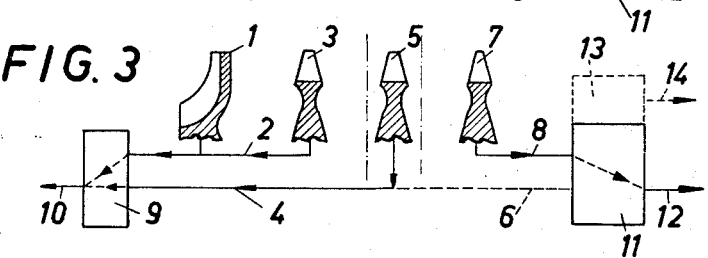
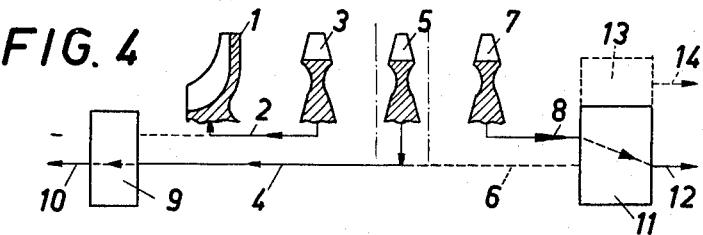
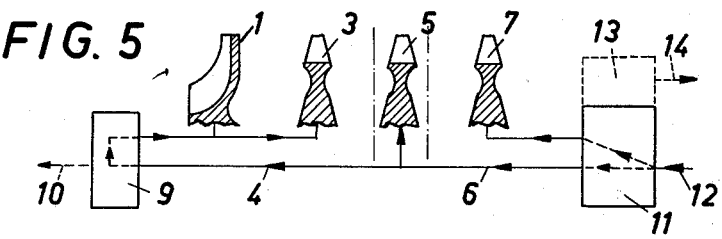
INVENTOR
Sven-Olof Kronogård et al
BY *[signature]*
ATTORNEYs March 3, 1970   SVEN-OLOF KRONOGARD ET AL   3,498,057
GAS TURBINE POWER PLANT
Filed Oct. 4, 1967                                26 Sheets-Sheet 11

FIG. 41
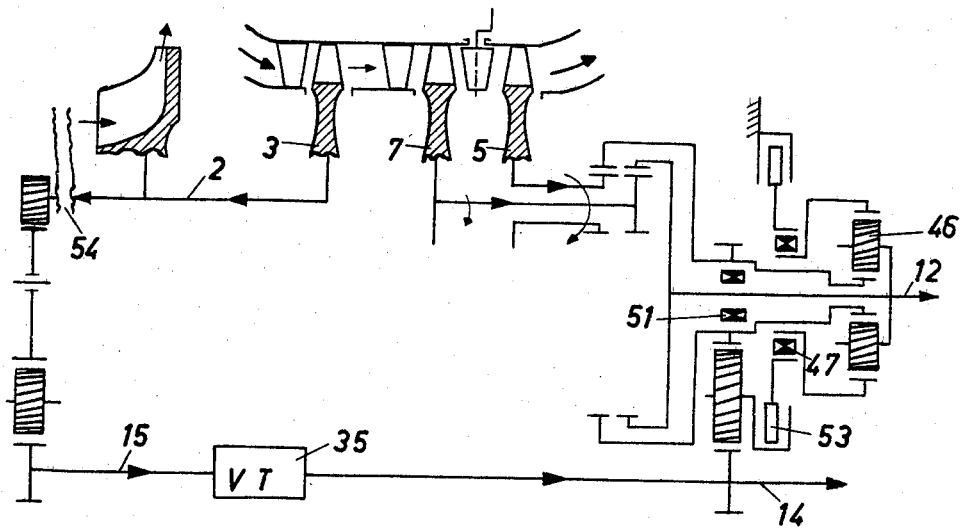
FIG. 41a
FIG. 42
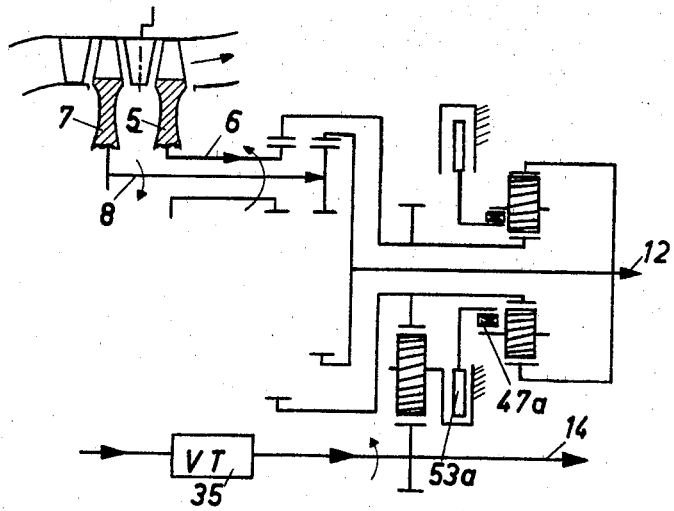

March 3, 1970   SVEN-OLOF KRONOGARD ET AL   3,498,057
GAS TURBINE POWER PLANT

Filed Oct. 4, 1967                          26 Sheets-Sheet 16

March 3, 1970 SVEN-OLOF KRONOGARD ET AL 3,498,057
GAS TURBINE POWER PLANT
Filed Oct. 4, 1967 26 Sheets-Sheet 25

United States Patent Office 3,498,057
Patented Mar. 3, 1970

3,498,057
GAS TURBINE POWER PLANT
Sven-Olof Kronogard and Clas-Olof Kronogard, Lomma, Sweden, assignors to Turbokonsult AB, Goteborg, Sweden
Filed Oct. 4, 1967, Ser. No. 672,869
Claims priority, application Great Britain, Oct. 13, 1966, 45,726/66
Int. Cl. F02c 3/10, 7/02; F16h 37/06
U.S. Cl. 60—39.16
12 Claims

ABSTRACT OF THE DISCLOSURE

A gas turbine power plant comprising a gas producer, a main power turbine and an auxiliary turbine with the latter having at least one power take off means separate from that of the main turbine. The rotors are arranged in a common gas passage from the gas generator. The power take off from the auxiliary turbine can be utilized independently of the main drive, but when no main drive is required, also take care of the full output of the gas generator for auxiliary purposes. By introducing power transformer means, the auxiliary turbine may be utilized for augmenting the main power output and/or for accelerating the gas producer. With an automotive plant the arrangement provides a good aerodynamic braking.

BACKGROUND OF THE INVENTION

Gas turbine power plants of conventional design are not directly suitable for industrial and tractive applications, which require great flexibility both with respect to power, heat recovery and speed with maintained low fuel consumption and simplicity of design. Improvements have gradually been made in various respects, but among the practically unsolved problems are still such factors as slow acceleration and poor engine braking, as well as high part load and idling fuel consumption. Furthermore, to obtain a suitable transmission for the main power take off and sufficient power and response for the auxiliary power take off implies a hitherto unsolved problem. Also, the requirement of versatility in auxiliary power supply, the control and recovery of exhaust heat energy has not been solved.

SUMMARY OF THE INVENTION

In general, the invention relates to gas turbine power plants and more particularly to such plants which include a gas producer, usually of the turbine type, comprising as main elements a compressor, a combustion chamber and a compressor turbine and further a power turbine system producing output power, said last mentioned turbine embodying a main turbine connected to the main power output. Usually a heat exchanger and/or other exhaust recovery means are incorporated for low specific fuel consumption. According to the invention, a third turbine, herein referred to as the auxiliary turbine, is introduced to drive a separate power take off. This turbine is also capable of assisting the compressor turbine during the gas producer acceleration and the power turbine for moving of the load. The rotor of the auxiliary turbine is located in the same gas passage from the gas producer as the rotor of the main turbine.

An object of the invention is to provide a complete power plant system, including a turbine system and transmissions, which is efficient, economical and sufficiently flexible to cover the various applications necessary in a manner justifying volume production corresponding to and surpassing that of the conventional piston engine, which is not possible with the hitherto known turbine designs.

More in detail and as earlier mentioned, one of the objects of the invention is to provide a power plant having acceleration characteristics and throttle response particularly suitable for a wide range of tractive, industrial and other applications, making it equal to or superior to the best piston engines.

Another object of the invention is to provide a gas turbine power plant which possesses high torque multiplication at the start and low output speeds which, together with a rapid acceleration to full power, results in excellent vehicle and load acceleration.

A still further object of the invention is to provide efficient engine braking without introducing any extra retarder and cooling equipment.

Another object of the invention is to provide simple means in the turbine system for varying the rate of exhaust heat for heating, air conditioning or other uses in relation to the supply of mechanical, electrical, hydraulic or pneumatic power, which for example, is of particular value for total-energy, industrial and railroad applications.

Finally, another and one of the most important objects of the invention is to improve the power take off accessory drive, the idle and part load fuel consumption which, together with the earlier described improved torque response for acceleration and retardation makes the system exceedingly well suited for various railroad, commercial automotive and industrial vehicle and other applications having similar requirements. The possibility of obtaining two or more independent power take offs, makes the system very suitable for earth moving, construction and handling equipment, as well as such applications as helicopters, ground effect machines and the like.

BRIEF DESCRIPTION OF THE DRAWING

The invention will be described more fully below with reference to embodiments thereof illustrated on the attached drawings.

FIGS. 1–14 are diagrammatic views showing some of the possible arrangements and operation phases of a gas turbine power plant according to the invention, FIGS. 29–58 are diagrammatic views of some detail arrangements of the turbine and transmission system for various applications.

DESCRIPTION OF SOME PREFERRED EMBODIMENTS

Basic system and principles

Figure 6:
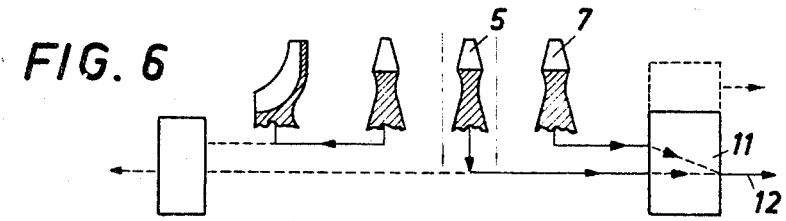

The gas producer may consist of a turbine type generator, or include a rotary combustion engine or a free-piston motor gas generator. The invention will herebelow be described in connection with a turibne type gas generator, but it is presupposed that gas may be obtained from any arbitarary suitable source.

FIG. 1 shows the basic rotor components of a turbine type gas generator system. As in a conventional system a compressor 1 is directly connnected to a turbine 3, the so called compressor turbine through a shaft 2 and the output power is delivered from a separate turbine 7, the so called power turbine or main turbine, through its shaft 8. According to the invention a separate turbine 5, herein referred to as the auxiliary turbine is introduced and has a shaft which by one part 4 extends towards the compressor side and with another part 6 extends towards the power turbine side and thus can assist on the compressor side and/or the power turbine side. In combination with the other arrangements to be described, the auxiliary turbine will eliminate the drawbacks of known gas turbines. FIG. 1 the auxiliary turbine is located between the compressor turbine and the main power turbine. The gas generator further comprises a combustion chamber 20 having a fuel burner 21. Usually a heat exchanger 21a and sometimes other exhaust heat utilizing means 21b are incorporated in the plant, in situations where low fuel consumption is of special importance.

FIG. 2 shows the same system as in FIG. 1, but with necessary transmission systems 9, 11 and 13 and the shafts for power take off means 10, 12 and 14, one for driving of the main load 12 and one or two for the accessory load 10 and 14. In FIG. 2 the auxiliary turbine 5 is coupled to the gas producer rotor, that is the compressor turbine in acceleration from idling or when there is a more or less instantaneous need for higher power, while the main power turbine is delivering the higher power to the main load.

FIG. 3 illustrates a condition in which both the compressor turbine and the auxiliary turbine are assisting each other in driving the accessory load at the front power take off 10, while the main power turbine is delivering power to the main load and/or the rear power take off 14, if such is used.

FIG. 4 shows an application where the auxiliary turbine is driving the power take off 10 independently of the compressor turbine or possibly supported by the main power turbine through the shaft 6. This has the advantage that the accessory load can be driven independently and without overloading the gas producer.

FIG. 5 shows how the system can be used for engine braking. The braking power is transmitted through the auxiliary turbine shaft and absorbed mainly in the compressor but also in the turbine system, including the auxiliary turbine as the compressor is pumping air through the system. If variable stators are used in the turbine system, the effect can be further increased, as will be later discussed.

FIG. 6 illustrates how the auxiliary turbine can assist the main power turbine in driving the main load through the combined transmission system 11.

Figure 7:
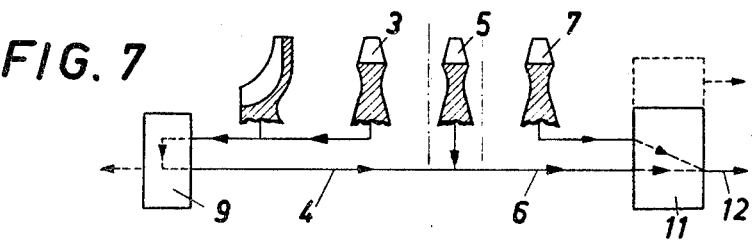

FIG. 7 shows how all tbre turbines can assist in driving the main load 12 and/or auxiliary loads through the transmission systems 9 and 11 and the shaft 4 and 6 of the auxiliary turbine.

Figure 8:
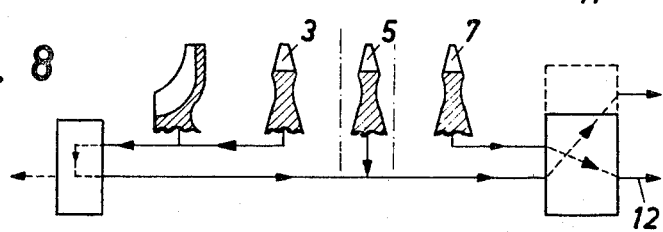

FIG. 8 indicates how the main load 12 can be driven by the main power turbine and the auxiliary load 14 jointly by the auxiliary turbine and the compressor turbine.

Figure 9:
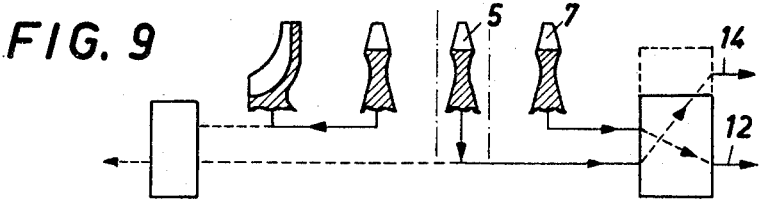

FIG. 9 shows a condition in which the auxiliary turbine 5 drives the rear power take off 14, while the main power turbine 7 drives the main load 12.

Figure 10:
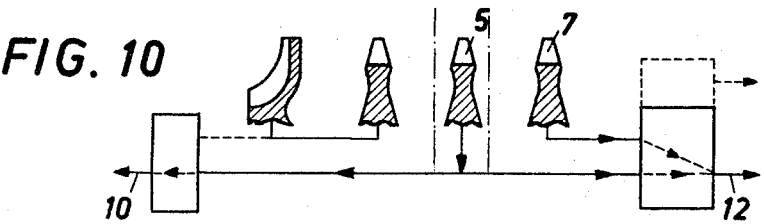

FIG. 10 again illustrates a condition in which the auxiliary turbine 5 drives the front power take off 10 and also assists the main power turbine 7 in driving the main load 12.

Figure 11:
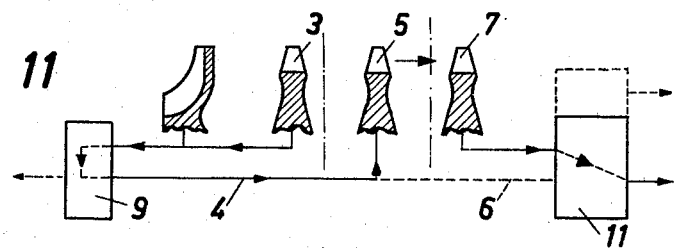

FIG. 11 shows an arrangement in which the auxiliary turbine 5 is aerodynamically so designed that it can also be used as an exhaust fan for the compressor turbine 3 and assist the compressor in pumping air through the system. Thus, if used without an intermediate stator, or a variable pitch stator, between the auxiliary turbine 5 and the main power turbine 7, the auxiliary turbine can modulate or alter the pre-swirl of the power turbine giving a similar effect as a variable pitch main turbine stator or if such is used, increase the effect thereof. The auxiliary turbine can also be used to moderate the amount of exhaust heat in relation to power used for heating and other use, an effect which can be increased by variable stators.

In this way, the specific load of the compressor turbine can also be increased at part throttle which increases the turbine temperature and reduces the specific fuel consumption. This can be done separately through transmission 9 or in connection with a mechanical loading of the compressor turbine through the transmission system 9 and 11 via the auxiliary turbine shaft 4 and 6.

Figure 12:
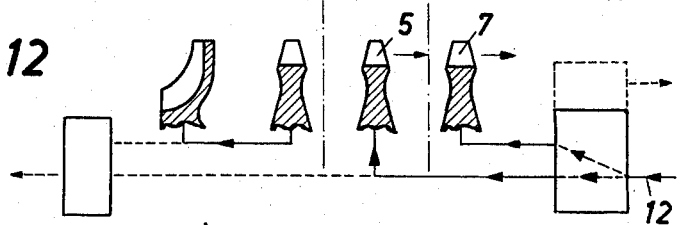

FIG. 12 shows how aerodynamic braking can be obtained through the turbine system alone, when both the auxiliary turbine 5 and the main power turbine 7 are operating as fans or compressors. The effect is augmented if variable stators are used in the auxiliary and/or the main power turbine. If the turbines are designed to rotate in opposite directions in relation to each other, a strong braking effect is obtained even without any stator being present between the two turbines, which are then operating together as a counterrotating fan or compressor system.

Figure 13:
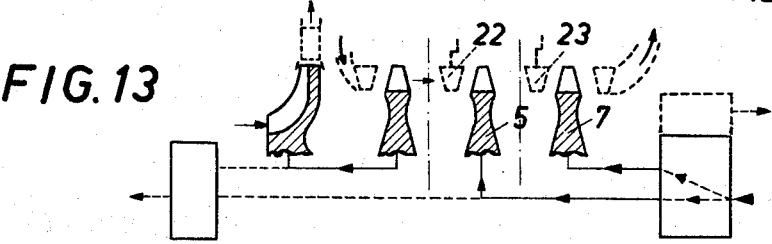

FIG. 13 shows the same system as in the previous figures, but with a stator system.

In the previous figures, for the sake of simplicity, the rotor system deliberately has been shown without any stators. However, in this turbine system, where according to the invention one main and one auxiliary power turbine are used, the stator system is of special importance, e.g. in adapting the component load to the operating conditions of the system. The greatest flexibility is obtained with two variable pitch stators, one stator 22 being ahead of the auxiliary turbine and one stator 23 after the same, while the simplest design is obtained without any stator at all, using transmission gears as a reactor element. The arrangement selected is dependent on the application and the characteristics desired, as later discussed.

Figure 14:
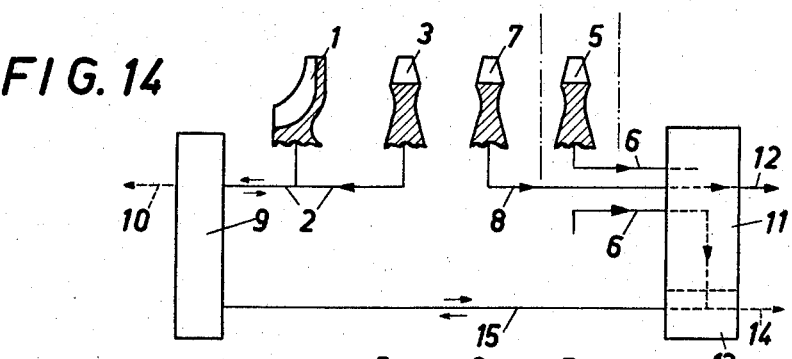

FIG. 14 illustrates how the connection between the auxiliary turbine 5 and the compressor turbine rotor 3 can be arranged by means of a shaft 15 externally of the rotor system. This arrangement makes possible the location of the auxiliary turbine downstream of the main power turbine, which is of advantage for certain applications. This is also possible e.g. by hydraulic or electric transmissions (pipeline or cable connections, respectively between generator and motor). Thus, the shaft 15 and part of transmission 9 and 13 are eliminated.

Figure 14A:
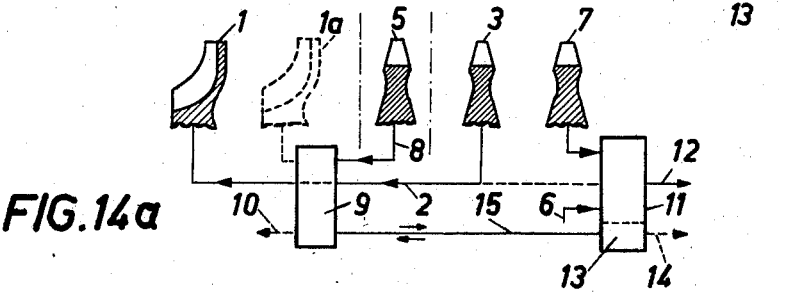

FIG. 14a shows an arrangement in which the auxiliary turbine is located upstream of the compressor turbine 3. The auxiliary turbine is connected to the gas producer, and/or the power turbine by mechanical, hydraulic, pneumatic or electric transmission means.

Furthermore, the auxiliary turbine can be equipped with or connected to a second stage compressor, which unit can be run alone for low fuel consumption at stand still, when idling or an accessory drive only is required. The second compressor stage raises the compressor ratio under normal running conditions, thereby reducing or eliminating the heat exchanger.

The flexibility of the general principle has been illustrated in the earlier figures and the pertinent description.

The following figures will illustrate two main design arrangments as regards the main construction of a turbine power plant according to the invention.

Figure 15:
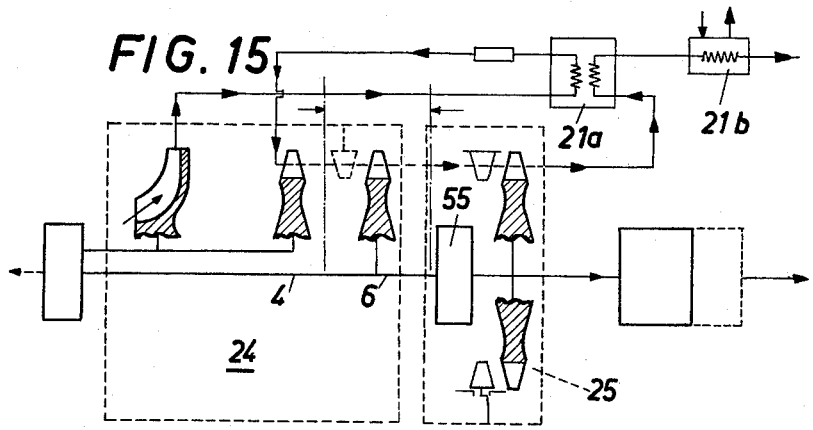
FIGS. 15–20 are diagrammatic views illustrating some general building block arrangements possible with the system.
Figure 16:
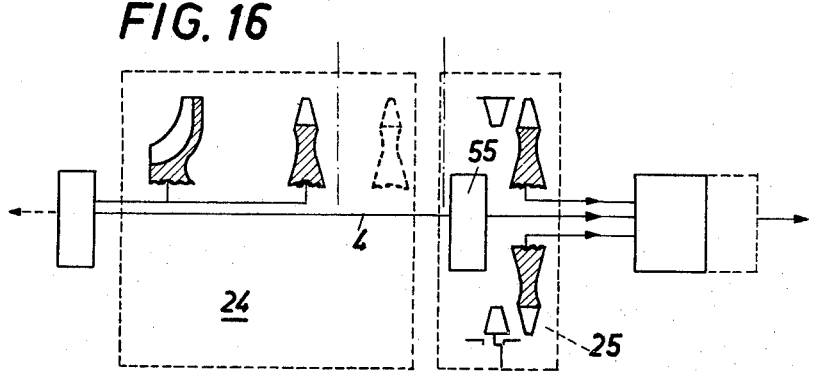
Figure 17:
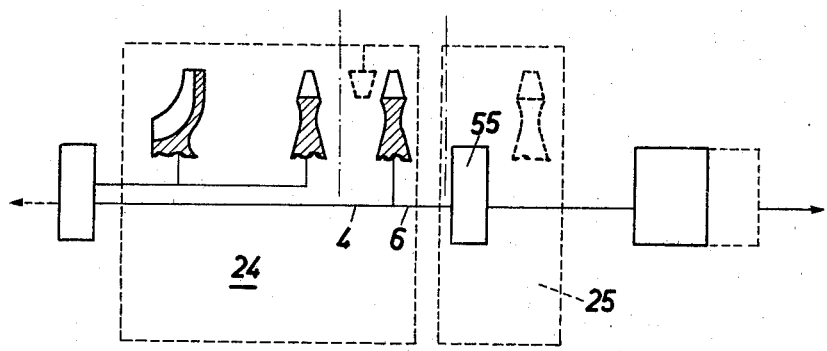
Figure 18:
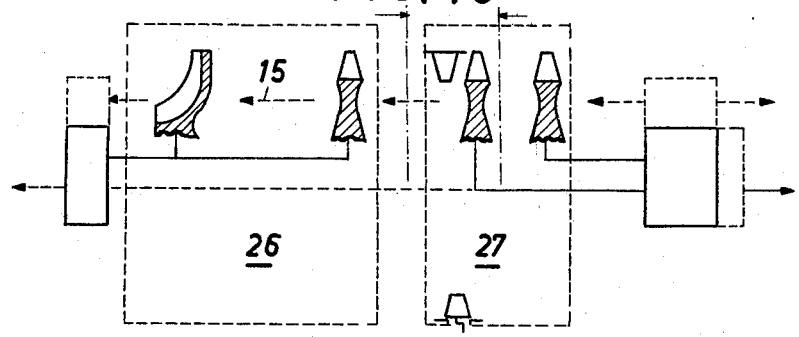
Figure 19:
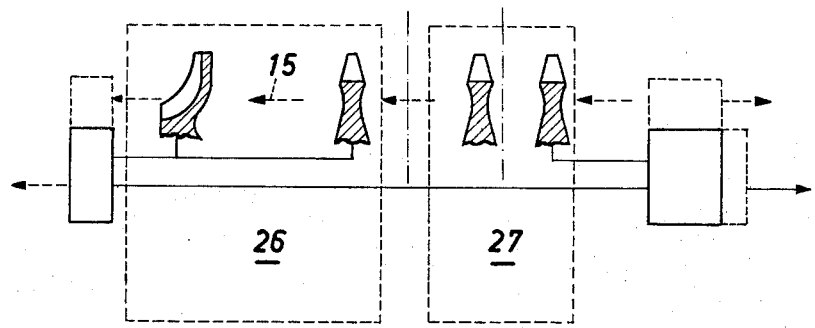
Figure 20:
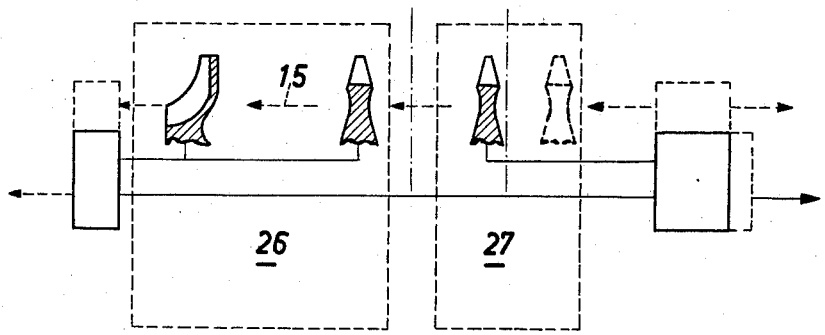

FIGS. 15–17 show a building block system in which the auxiliary turbine 5 is incorporated in the gas producer section, while FIGS. 18–20 show a system in which the auxiliary turbine is incorporated in the power turbine section. This system includes a free wheel/slipclutch 55 to be described in connection with FIG. 43 or other variable transmission means.

In the first type, a gas producer section 24 alone can be used as a single spool machine and/or as a two spool machine, and then be combined with a free power turbine 25 (FIGS. 15 and 16) or just a transmission system (FIG. 17).

In the second type of design, a gas producer unit 26 is always the same while a power turbine block 27 is made in different versions with two turbines or with just one turbine. The building block system then also incorporates various power take off and reverse gear arrangements as will be later described.

Performance and general characteristics

As regards the performance and operation, some of the most important characteristics are described in the following with reference to the diagrams shown in FIGS. 21–28.

Figure 21:
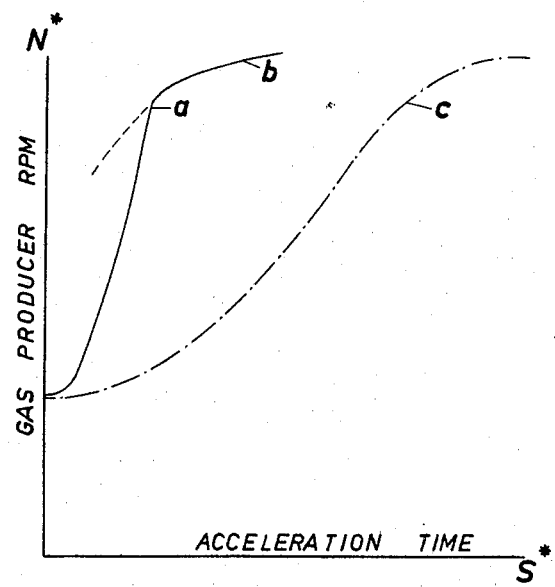
FIGS. 21–28 are diagrams indicating some of the performance characteristics of turbines according to the invention, as compared to presently known turbines.

FIG. 21 indicates the acceleration characteristics from idle to full speed of a gas producer according to the invention $a$ and $b$ as compared to a conventional system $c$. During the phase $a$, the auxiliary turbine assists the compressor turbine, while during the phase $b$ the compressor is driven by the compressor turbine alone. If a stepup gear ratio is used between the compressor and the auxiliary turbine, the effect of the auxiliary turbine inertia is reduced by the second power, while the torque to the compressor is only reduced by the first power, thus giving possibilities of further improving the acceleration in this way.

Figure 22:
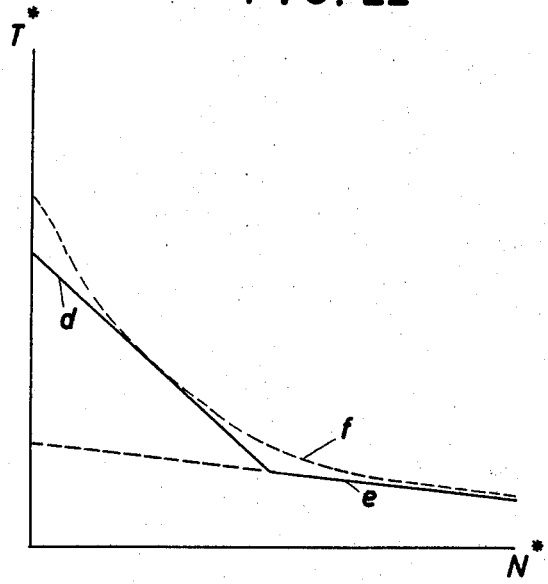

FIG. 22 shows the improved torque characteristics, with curve $d$ compared to $e$, at low speeds when the auxiliary turbine is used to assist the power turbine. Further improvements according to curve $f$ can be obtained by the use of variable pitch stators or an infinitely variable transmission between the auxiliary turbine and the main power turbine as will be described.

Figure 23:
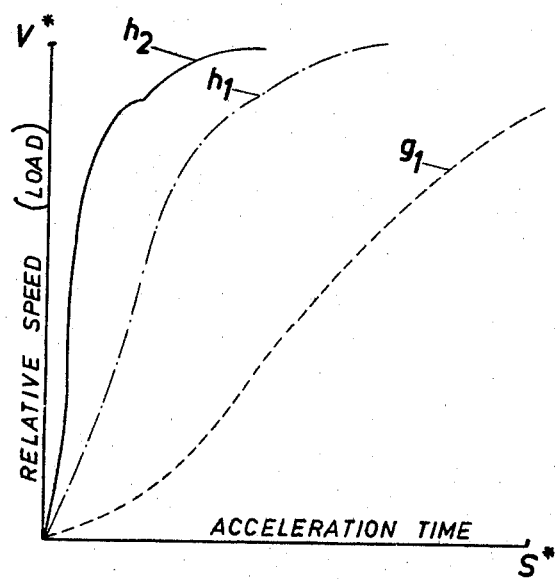

FIG. 23 illustrates the resultant acceleration characteristics $h_1$, when the auxiliary turbine is used on the power turbine side alone and $h_2$ when it is used first on the compressor side and then on the power turbine side or simultaneously on both, e.g. through infinitely variable transmissions as later set forth. The characteristics of a standard system is indicated by curve $g_1$.

Figure 24:
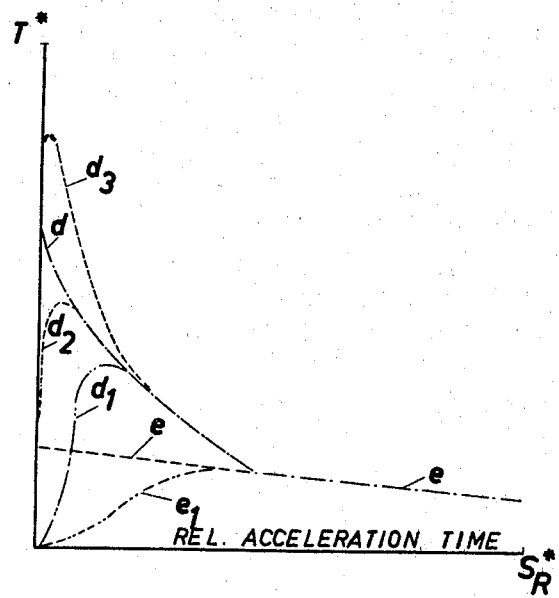

FIG. 24 shows the corresponding torque curves versus time, i.e. throttle response. Here $e$ and $e_1$ correspond to the static and dynamic torque curves of a conventional single power turbine system, while curve $d$ and $d_1$ are the corresponding curves for an auxiliary turbine assisted power turbine and $d_2$ the dynamic torque curve for a system with an auxiliary turbine assisted gas producer and power turbine. Curve $d_3$ corresponds to an acceleration from full gas producer speed and superimposed inertia effect of the auxiliary turbine which is possible with this system. This is frequently used in piston engine applications, but not practically or safely possible in hitherto known turbine power plants.

Figure 25:
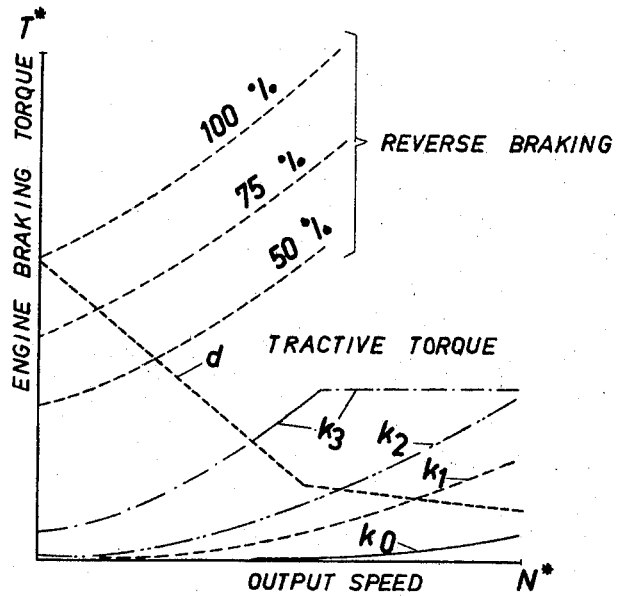

FIG. 25 shows the engine braking characteristics for various system arrangements according to the invention as compared to a conventional system having a negligible power turbine braking effect $k_0$. This however, can be somewhat improved by variable power turbine nozzles.

Curve $k_1$ indicates the effect of compressor braking while curve $k_2$ indicates the same with variable geometric nozzles and $k_3$ a further increase with added aerodynamic auxiliary turbine braking. For comparison, the maximum driving torque $d$ is shown in the same diagram, indicating the excellent engine braking possibilities. Further emergency reverse braking is shown for various percentages of engine power.

Figure 26:
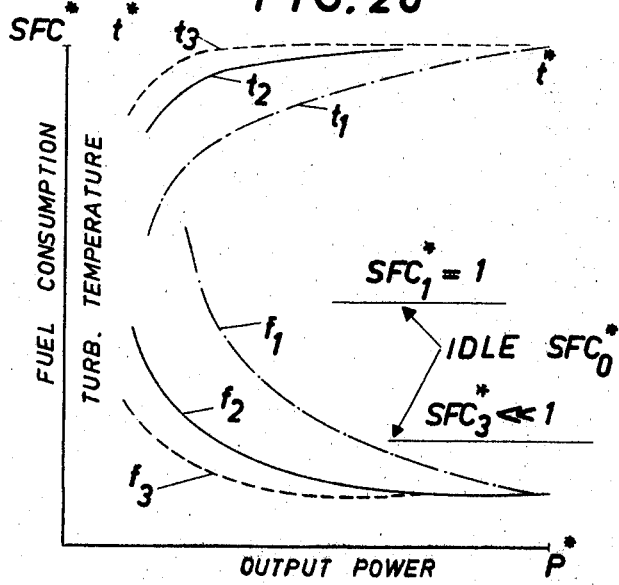

FIG. 26 shows the specific fuel consumption at part load with a conventional turbine system $f_1$ and a system according to the invention without $f_2$ and with $f_3$ variable geometric stators and power transfer. The corresponding turbine temperatures are indicated by curves $t_1$, $t_2$ and $t_3$.

The effect of the auxiliary turbine on the idling fuel consumption is also indicated $SFC^*_3$ relative to that of a conventional turbine $SFC^*_1$. Among the reasons for this marked improvement are the lower idling speeds possible both with respect to the improved acceleration, the improved compressor and turbine match and the use of variable stator geometry and auxiliary turbine power transfer.

Figure 27:
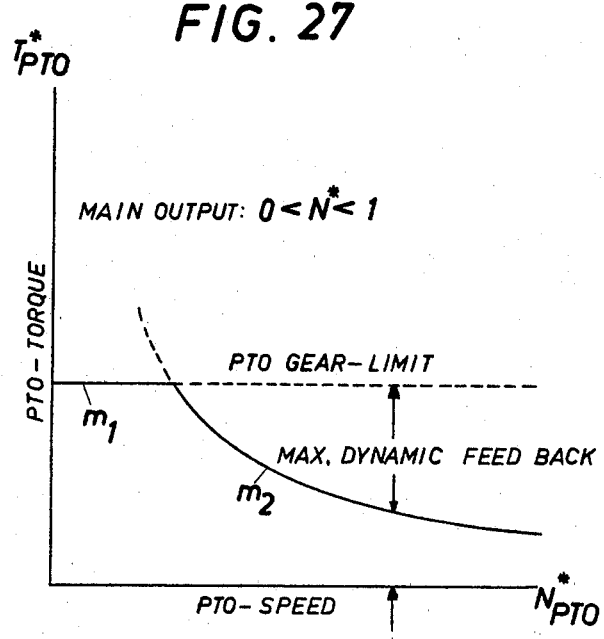

FIG. 27 shows the torque characteristics of the auxiliary turbine driven power take off if an infinitely variable transmission is used as a combining gear. The system also permits temporary inertia feed back from the auxiliary turbine within the capacity of the power take off transmission, which can be protected against overload by a proper setting of the slip limit of the transmission system, torque limiting device as later indicated.

Figure 28:
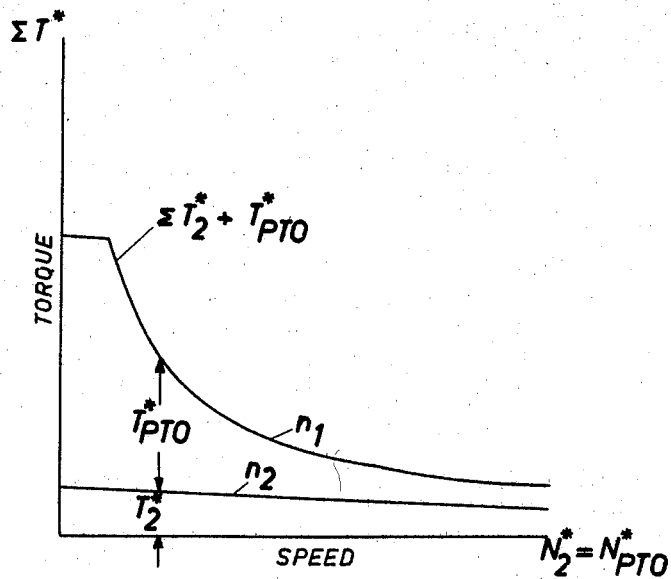

FIG. 28 indicates total output torque power from the main and the auxiliary power take off (PTO) as well as max. torque available on the auxiliary power take off without using any additional torque from inertia of the load, or otherwise from the main power transfer or gas producer system.

Turbine and transmission combinations

Figure 35:
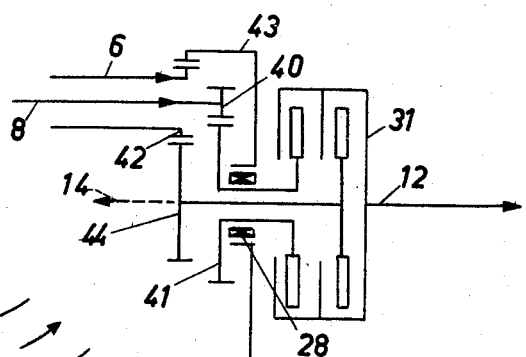
Figure 36:
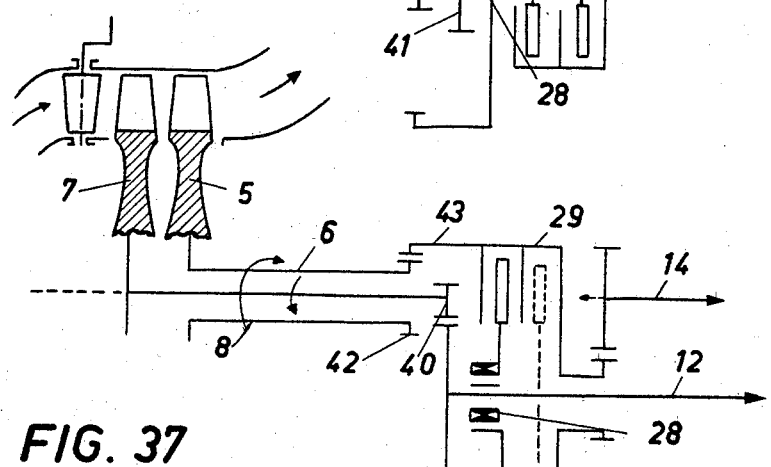
Figure 37:
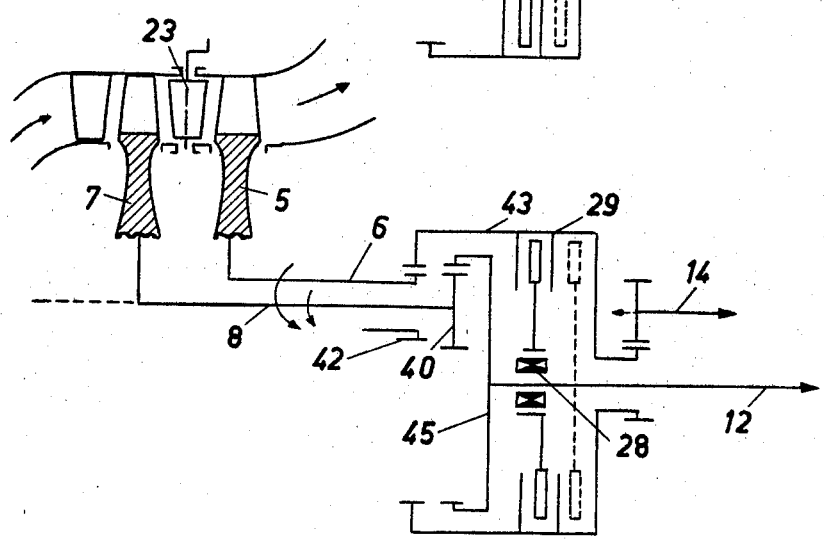

With regard to the detailed arrangements of the turbine transmission some of the possible arrangements according to the invention are disclosed in FIGS. 29–58. FIGS. 29–34 shows some compact integrated reduction and combining gears of the external, stepped pinion type for the auxiliary and main power turbines. The shafts of the turbines are coaxial, while FIGS. 35–37 show some even more compact internal combining reduction gears in which the shafts are off-set in relation to each other.

Figure 29:
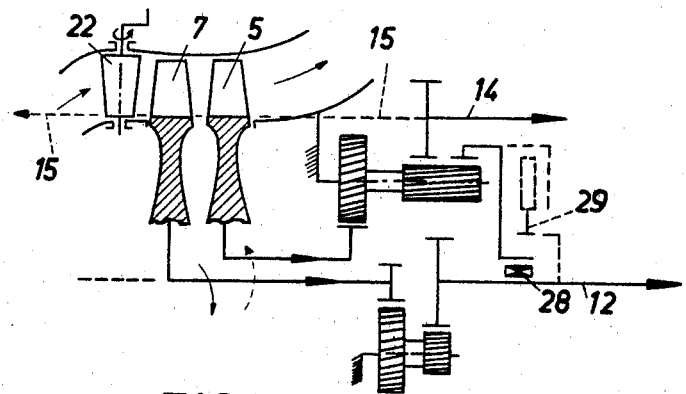

FIG. 29 shows a system where the connection between the main turbine 7 and the auxiliary turbine 5 consists of a free wheel 28 and/or a friction clutch 29. The free wheel can be used in two ways. In one of these ways the free wheel prevents the PTO 14 from running faster than determined by the gear ratio between the auxiliary turbine and the main power turbine, thereby effecting as automatic cut in and cut out of the auxiliary tubine. In the other arrangement the free wheel prevents the auxiliary turbine from running slower than the main power turbine. The latter is to be preferred, as it makes possible full speed PTO-operation even at stalled or reverse rotating main power turbine. At the same time, this system permits the utilization of the inertia effect of the vehicle or the main load at high speeds and further aerodynamic braking at any speed through the counter rotating turbine system and the variable geometric stator at the engaged friction clutch.

Figure 30:
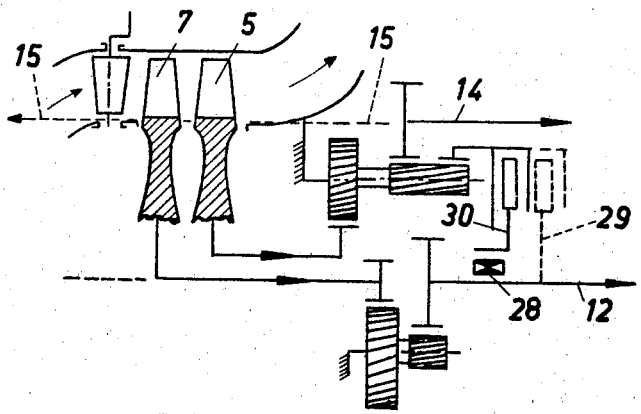

FIG. 30 shows a system which basically gives the choice within one and the same design of the use of any of the characteristics mentioned above depending upon operation requirements or application. This embodiment includes a clutch 30 for disconnecting the free wheel.

Figure 31:
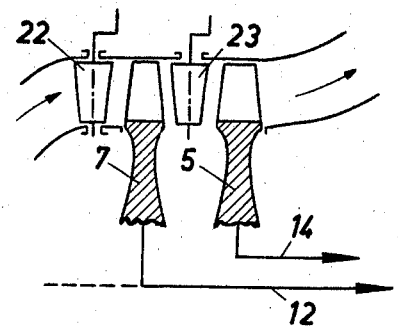

FIG. 31 shows how the turbine system can be equipped with two variable pitch stators giving complete control of power division between the auxiliary turbine driven PTO 14 and the main power turbine driving the main load 12. Here the power can be infinitely varied from 0 to 100% for one of the turbines, while the power of the other at the same time goes from 100 to 0% and vice versa. Further, this system also lends itself both for co-rotation and counter-rotation of the two turbine shafts. The design results in extremely good performance and control.

Figure 32:
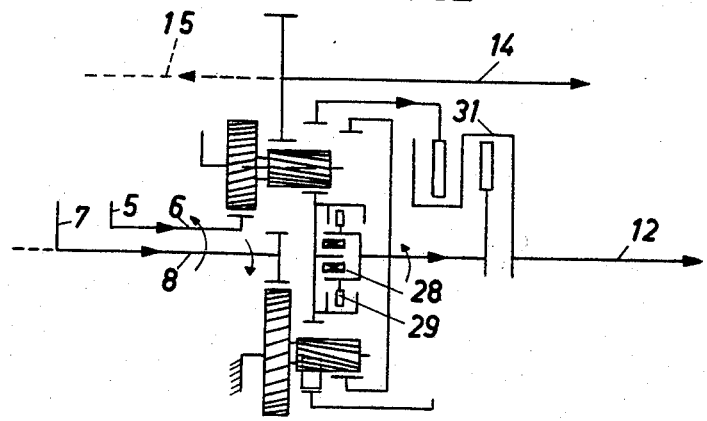

FIG. 32 shows a system with basically the same characteristics as that shown in FIG. 29 but with an incorporated clutch means 31 for forward and reverse drive and a somewhat different location of the free wheel 28 and the friction clutch 29.

Figure 33:
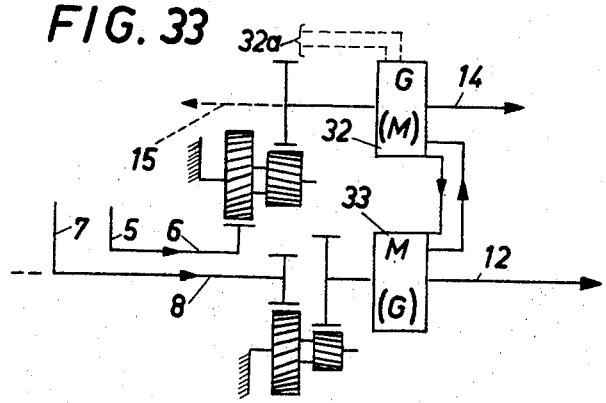

FIG. 33 shows a system similar to that shown in FIGS. 29 and 30 but with the ring gear free wheel and friction elements forming the connection between the auxiliary and the main power turbines being replaced by an infinitely variable transmission comprising a first part 32 capable of functioning as a generator and motor G (M), possibly with an auxiliary take off 32a and a second part 33 capable of functioning as a motor or as a generator M (G). This transmission can be of the electric or hydrostatic type, or any other type permitting an infinitely variable transmission. Also, a stepped type provided with slipping clutches can be used.

Figure 34:
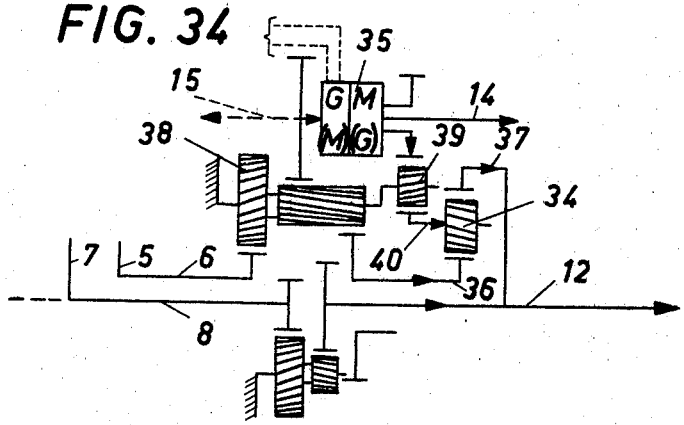

FIG. 34 shows a differential planetary combining gear 34 utilizing an infinitely variable transmission VT 35, which is arranged in such a way that the auxiliary turbine 5 drives the PTO 14 and a sun gear 36 of the differential in a direction opposite to that of the main output shaft 12 and an attached ring gear 37. The input of the variable transmission is driven from the auxiliary turbine reduction gear and the reaction torque is taken up by the output shaft 12 via an idler 39, a planetary carrier 40 and the ring gear 37. Thus the speed ratio between the two turbines is infinitely variable and the ideal power division between the PTO and the main power output can be selected. The variable transmission 35 can, as before, be of any suitable type such as electric, hydraulic, pneumatic, mechanical friction drive, or a controlled slip clutch. In the embodiments above described, the main output shaft 12 is co-axial with the turbine shafts.

FIG. 35 illustrates an arrangement with similar characteristics as that of the system shown in FIG. 32 but with the output shaft off-set in relation to the turbine shaft. This system gives a forward and reverse drive and completely automatic operation of the power-turbine with aerodynamic turbine control without any transmission shift control system. It further gives full aerodynamic engine braking and an extremely simple design, which makes it very attractive for a series of vehicle applications in which low volume, low weight, simple design and low price are of extreme importance. The shaft 8 of the main turbine 7 is connected to a reduction gear having two wheels 40, 41 with external teeth. The shaft 6 of the auxiliary turbine 5 is provided with a pinion 42 mating with an internal ring gear 43 and with a further, external wheel 44 driving the power take-off shaft 14. Wheels 41 and 44 are connected by clutch means 31 for forward and reverse drive of the main output shaft 12. A free wheel 28 is arranged between a ring gear 43 and the output shaft from wheel 41.

FIG. 36 shows a system similar to that of FIG. 30 but but with a free wheel 28 and clutching means 29 similar to those in FIG. 30. A reverse gear can if desired be included in connection with the output shaft 12 as in FIG. 35.

FIG. 37 shows the same arrangement as above described but with a variable geometric nozzle 23 between the turbines for improved PTO and main power turbine control and to make both turbines rotate in the same direction. The reduction gear of the main turbine will then also include an internal ring gear wheel 45.

Figure 38:
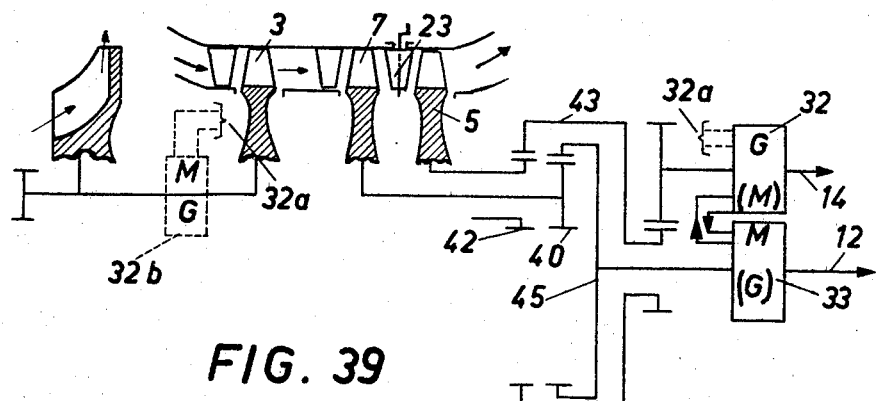

FIG. 38 shows the same basic system as in FIG. 37 but with the free wheel and the friction clutches replaced by an infinitely variable transmission 32, 33 similar to that in FIG. 33. In addition power transfer can be obtained from the gas producer through a connected system 32a, 32b.

Figure 39:
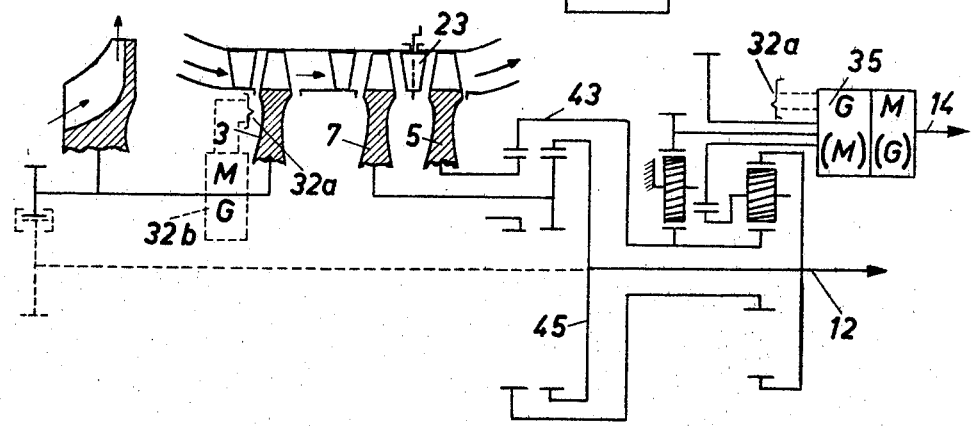

FIG. 39 is in a similar way parallel to the system shown in FIG. 34. The power transfer 32a, 32b, can be electric or hydraulic, component 32b being e.g. a pelton wheel.

Figure 40:
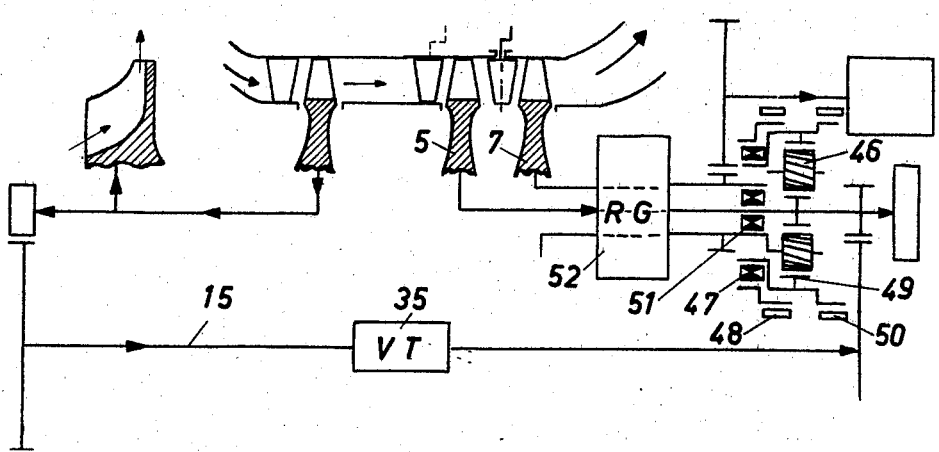

FIG. 40 shows a system referring to the principal arrangement shown in FIG. 14 with an external connection 15 between the gase producer rotor and the auxiliary turbine, which is equipped with a variable transmission 35. The auxiliary turbine can also, through a planetary gear 46, a band controlled free wheel 47–48, and a band controlled ring gear 49–50, assist both the main power turbine and the compressor turbine via the variable transmission 35. Aerodynamic engine braking is obtained through the auxiliary and main output shafts via a reduction gear 52, which may be of a mechanical or hydraulic type jointly from the auxiliary turbine through an inner free wheel 51 and from the compressor via the auxiliary turbine and the transmission 35. The functions of the brake bands and the outer free wheel are in accordance with that earlier described for the clutches and free wheel in FIGS. 29 and 30.

FIG. 41 shows a similar arrangement as that in FIG. 40, but with the auxiliary turbine 5 arranged downstream of the main power turbine 7 and by a planetary gear 46 and two free wheels 47, 51 with the former being controlled by a friction clutch 53 and to the gas producer by a variable transmission 35. The latter is preferably of the infinitely variable type but can in its simplest form consist of a friction clutch or a free wheel and a combined friction and freewheel clutch such as shown in FIGS. 43–51 and to be later described. The interruption at 54 in the drive between shafts 2 and 15 indicates the possibility of including a drive 54a for a pre-compressor wheel to the compressor 1, i.e. a supercharger stage 54b, as indicated in FIG. 41a, connected to the gas producer or via a free wheel.

FIG. 42 shows a similar system as that in FIG. 41, with the main difference being that the turbines of the former rotate in the same direction, while in the latter embodiment are of the counter-rotating type. The planetary gear is adapted to meet the amended rotation requirements.

Figure 43:
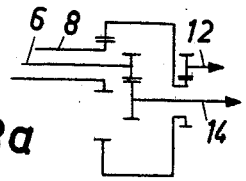

FIG. 43 shows a simplified system related to those of FIGS. 39–42, which all have a planetary gear torque multiplier between the auxiliary turbine and the main power turbine, and a continuously variable transmission.

The arrangement is the same as in FIG. 36 but without the free wheel lock up clutch. The transmission between the auxiliary turbine and the gas producer rotor is simplified and consists of a free wheel and a lock up clutch provided with slipping features 55 inserted in the connection shaft 15. The stators 22, 23 of the auxiliary and/or the main power turbine can also be of the fixed type, depending upon application and requirements.

For some applications, the stators between the auxiliary and the main power turbine can be completely omitted. This will, however, require a specially designed turbine system having both turbines rotating in the same direction. Here the auxiliary turbine can be used in a new and unique way to assist the compressor turbine, or act as a pre-whirl fan with aerodynamic power transfer from the compressor turbine via the auxiliary turbine to the main power turbine.

In performing this fan aspect the auxiliary turbine can also assist in increasing the mass flow through the system, thus making it possible to influence the total power output. The turbine or fan effect is selected or controlled by the variable nozzles used in this case in front of the auxiliary turbine.

Figure 43A:
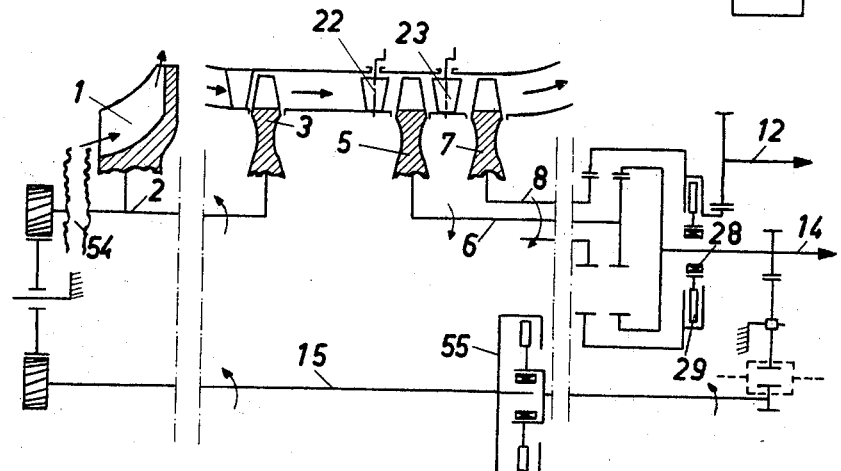

FIG. 43a shows a similar arrangement to FIG. 43 but in this case, the reduction-combining gear is designed for a counter-rotating turbine system. For some applications, one or both of the stators can be dispensed with completely, making a really simple system with very attractive torque, acceleration and fuel consumption characteristics.

Figure 44:
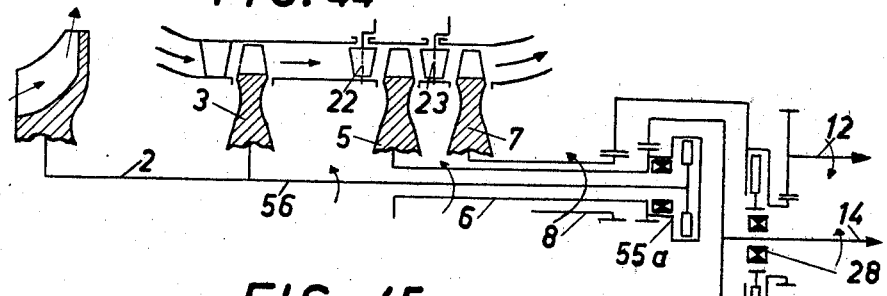

FIG. 44 and the following systems up to FIG. 56 can be varied in the same ways as described in connection with FIGS. 43, 43a and have a further simplified and compact principal design arrangement in that the external shaft corresponding to 15 in FIG. 14 is replaced by an extension 56 of the compressor turbine shaft 2 through, in this case, hollow auxiliary turbine shaft 6 into the power turbine gear. Here, the free wheel and the lock-up or slipping clutch 55a for the aerodynamic power transfer of the auxiliary turbine is located. Thus, several gears, shafts, bearings and other gear box details are eliminated and there is realized a very compact design. The main turbine shaft 8 is tubular and encloses the two other shafts mentioned.

Figure 45:
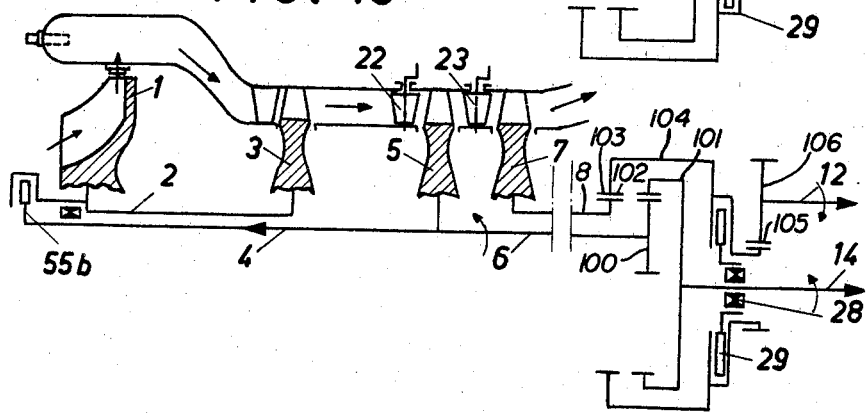

FIG. 45 shows the same system again, but with the free wheel and the clutch 55b located in an accessory gear box ahead of the compressor 1. In this case, it will be noted that the compressor turbine shaft 2 is hollow and the auxiliary turbine shaft 6 and extension 4 thereof is concentrically disposed within the shaft 2. Variable pitch stators 22 and 23 are respectively arranged ahead of and behind the auxiliary turbine 5 which is operably related to the inner shaft 6.

The free end of the extension 6 of the inner shaft 4 is affixed to an externally toothed wheel 100 which in turn is in mesh with a ring gear 101 having internal teeth via a pinion 102. The power take off means 14 is operably related to the ring gear 101 and such power take off means together with the ring gear 101, the pinion 102, the wheel 100 and the extension 6 constitute an auxiliary power drive line.

The shaft 8 of the main power turbine is coupled by way of a pinion 103 with an internal ring gear 104 which, via a clutch 29, pinion 105 and external toothed wheel 106 is operably related to the power take off 12. The wheel 106, pinion 105, ring gear 104, pinion 103 and shaft 108 define a main power drive line.

It will be appreciated from the foregoing that reduction gear means are connected to the outer shaft and the inner shaft of the assemblage constituted by the shafts 8 and 6 respectively. This design eliminates one of the two hollow shafts on the power turbine side, which makes the bearing arrangement and the turbine disc attachment easier. A further simplification, eliminating also the hollow shaft of the compressor turbine is shown in FIGS. 15–17 in which the transmission (free wheel/clutch) is located between the compressor turbine and the auxiliary turbine. This design requires some special heat shielding, which usually can be arranged. This last mentioned location is ideal if the gas producer and the power turbine units are arranged at an angle to each other and the connection between shafts 2 and 6 is made through an angle drive or a variable type of transmission, in which case these gear or connecting details can be externally arranged.

Figure 46:
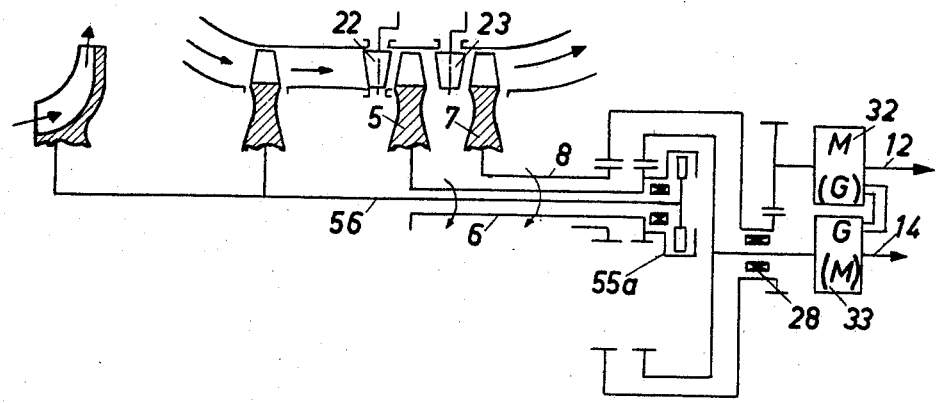

FIG. 46 shows the same system as that in FIG. 44, but with the rear clutch 29 (giving two possibe relationships, coupled or independent) replaced by an infinitely variable transmission 32, 33 of the electric, hydrostatic or other type, similar to that of FIGS. 33 and 38.

FIG. 47 again shows the same basic system as in FIG. 46, but including an integrated variable transmission system 35 at the PTO 14.

Figure 47:
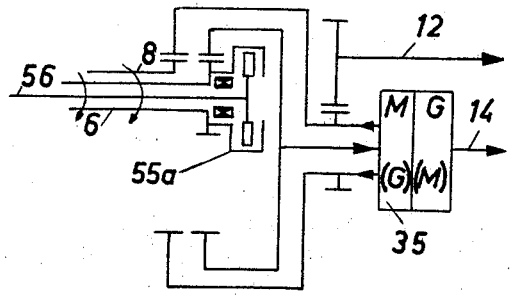
Figure 48:
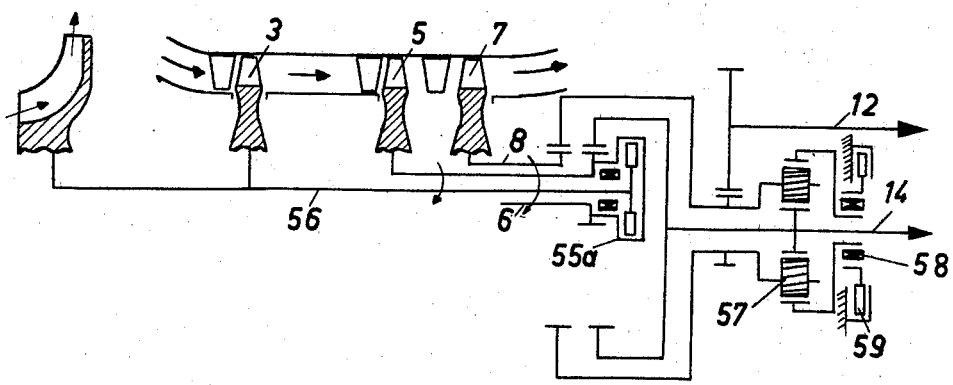

FIG. 48 is the same system as that in FIG. 47, but instead of the integrated variable transmission, it uses a planetary transmission 57 operated by a free wheel 58 controlled by a friction clutch 59. Power is transmitted from the auxiliary turbine 5 and the torque multiplying planetary gear 57 to the output shaft 12, thus assisting the power turbine in accelerating the load, while the connections between the compressor turbine 3 and the auxiliary turbine 5 are arranged as previously described.

Figure 49:
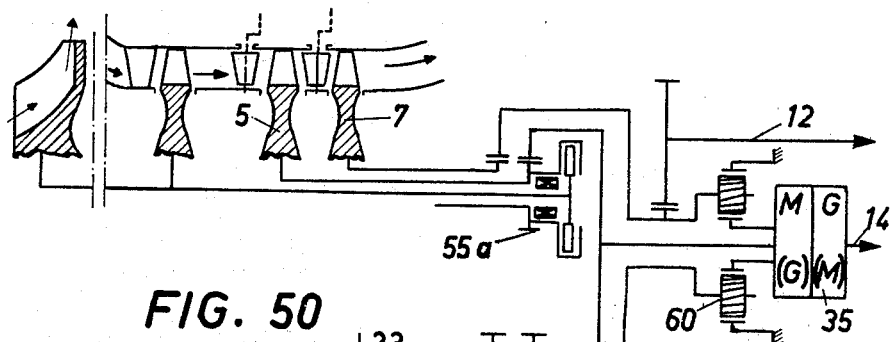

FIG. 49 shows a modification to the system of FIG. 48, but with the free wheel and clutch arrangement replaced by a variable transmission 35. This is combined with a differential plus a planetary gear 60, so that the torque of the variable transmission is comparatively low and thus the total efficiency is high and the size small. If the transmission is of the infinitely variable type, the variable stators can be omitted. This also holds for the previously described systems using infinitely variable transmissions.

Figure 50:
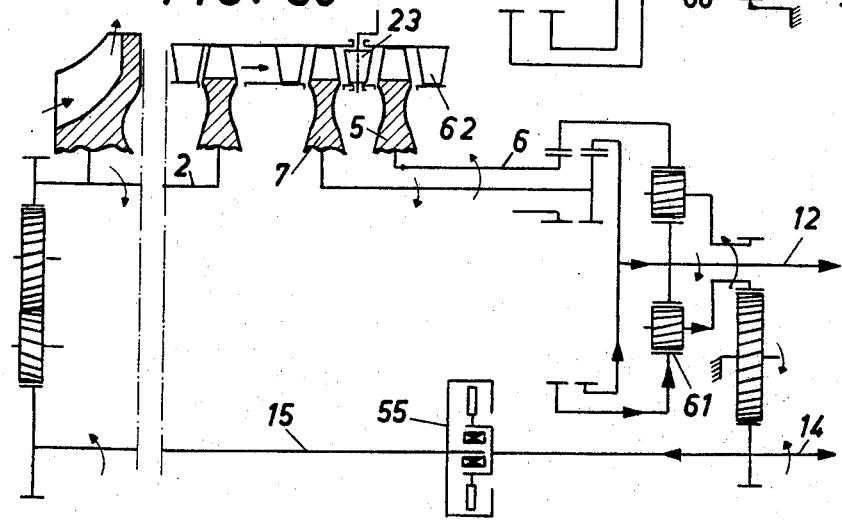

FIG. 50 shows a system in which the variable transmission is replaced by a variable stator 23 for the control of the auxiliary turbine 5 which is combined with a differential gear 61 in the external shaft 15 between the gas producer rotor 2, the main power turbine 7 and the auxiliary turbine 5 which is rotating in the opposite direction to the main power turbine. During acceleration from stand still and idling, the main turbine is driving the main load in an ordinary way, while at the same time the auxiliary turbine assists both the main power turbine and the compressor through the planetary gear and the free wheel 55 on the external shaft 15. Even at high compressor speed the auxiliary turbine can still supply power both to the compressor and the main power turbine, with the amount being continuously regulated by the variable geometric stator 23 of the auxiliary turbine.

This will cause the auxiliary turbine to run at gradually increasing speed at the speed of the main power turbine is increasing and at a speed which is greater than that of the main power turbine when this is operated at high speed. However, as the auxiliary turbine here is on the cool end of the gas stream, this can be done without detrimental effect to the life of the turbine, and the arrangement is in effect better utilizing the available material. At part load the auxiliary turbine is used for split torque aerodynamic-mechanical power transfer when the free wheel clutch 55 is locked up. The auxiliary turbine 5 is then operating as an exhaust fan, thus reducing the back pressure of the main power turbine 7 and increasing the relative gas producer load and hence the turbine cycle temperature. Thus, the gas producer efficiency is increased and specific fuel consumption reduced. Infinite control is effected by means of the variable geomertic stator 23 which here also is located on the cool exhaust side. To improve the exhaust fan efficiency and pressure recovery, the auxiliary turbine can, as shown, be equipped with "a" bladed exhaust diffusor 62. By means of the differential gear, the variable geometric stator and the free wheel lock-up clutch, engine braking can automatically be obtained. The effect can further be increased by inserting a braking free wheel in the differential planetary gear, for example between the sun gear and the planetary carrier as in FIG. 40.

Figure 51:
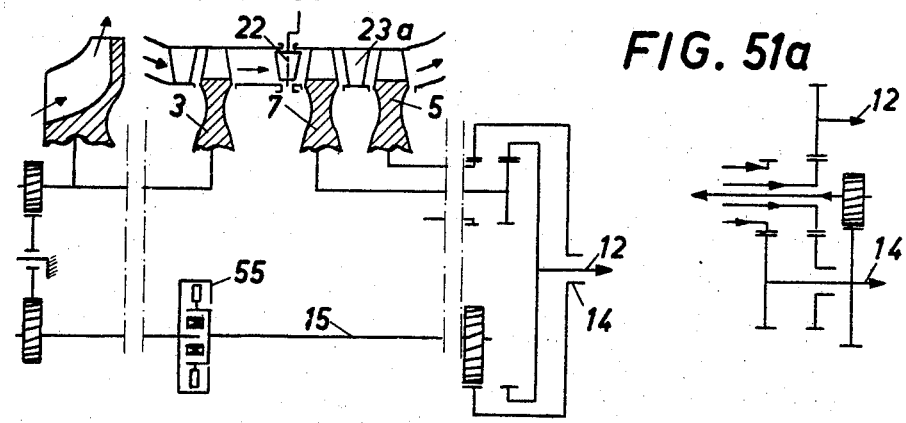
Figure 51A:
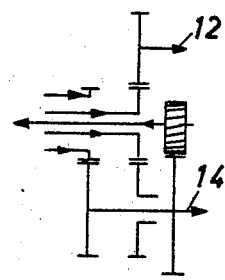

FIGS. 51 and 51a show variations of the same system as regards the gears on the power turbine side in the connection between the auxiliary turbine and the gas producer rotor. FIG. 51a shows an arrangement in which the connection can be made internally through hollow shafts instead of externally as in FIG. 51.

In this connection, it should be pointed out that the off-set distance of the shaft can be extended or reduced and rotational direction changed by the insertion or omission of suitable idle gear which do not change the principles disclosed. In this embodiment, the main turbine 7 is provided with a variable pitch stator 22, with the stator 23a ahead of the auxiliary turbine being of the fixed or variable type.

Figure 52:
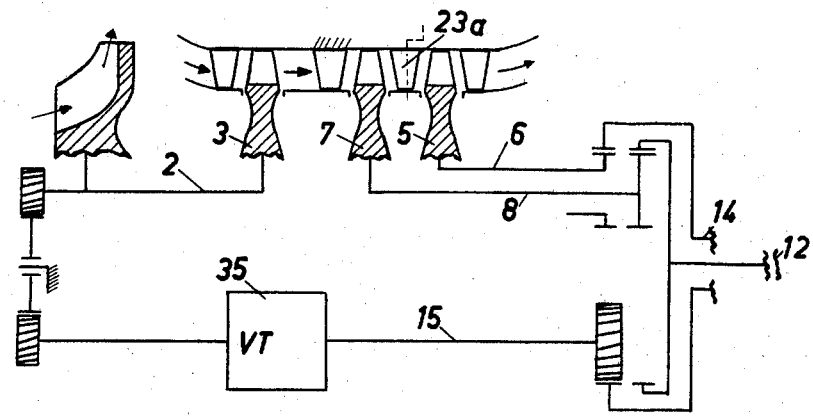

FIG. 52 shows the same system as in FIG. 51, but with an infinitely variable transmission 35 connecting the auxiliary turbine and the gas producer rotor.

Figure 53:
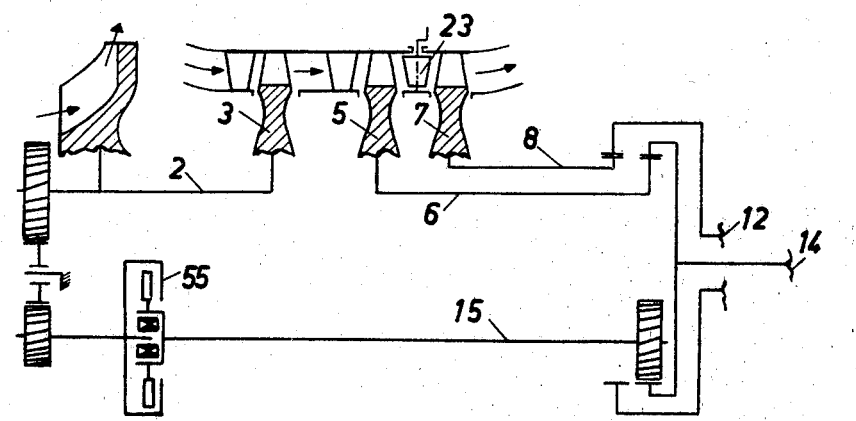

FIG. 53 shows a similar arrangement, but with the auxiliary turbine 5 located ahead of the main power turbine 7 and thus permitting the use of the auxiliary turbine for compressor braking and for gas producer acceleration as before, but also as an exhaust fan of the compressor turbine. Further, the auxiliary turbine can be used as an inlet swirl modulator for the main power turbine or merely as an exhaust fan by the use of variable geometric power turbine nozzles.

Figure 54:
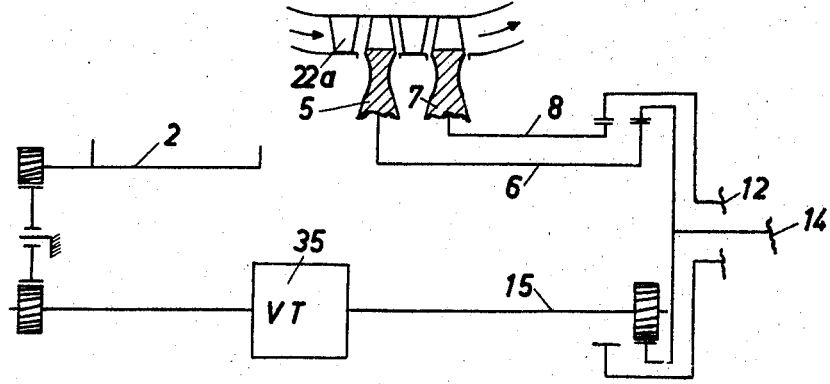

FIG. 54 shows a system similar to that of FIG. 52, i.e. with variable transmission 35 between the auxiliary turbine and the gas producer rotor, but with the auxiliary turbine 5 located ahead of the main power turbine 7 and equipped with a fixed or a variable stator 22a.

Figure 55:
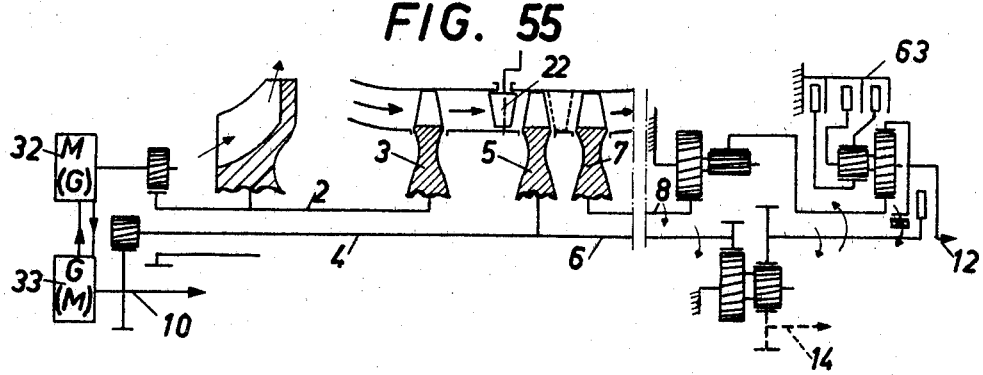

FIG. 55 shows a system in which the power transmission between the auxiliary turbine 5 and the compressor turbine 3 is effected by a variable transmission 32, 33, of the electric or hydrostatic type which, in this case, is located in an auxiliary gear box ahead of the compressor. The connection to the main power turbine is effected through a free wheel and clutch 63 located in the power turbine gear box, which has a 3-speed forward planetary gear and no reverse. One or more reverse gears can be obtained if a lock-up clutch is introduced, e.g. between the two sun gears and an idler is introduced between the front sun gear or the front ring gear and the small diameter stepped planetary gear. Further, an anti-creep or hillholder effect can be obtained if two of the clutches are applied simultaneously at stopped vehicle or load and released throttle and accordingly disengaged at throttle depression and/or moving load.

Figure 56:
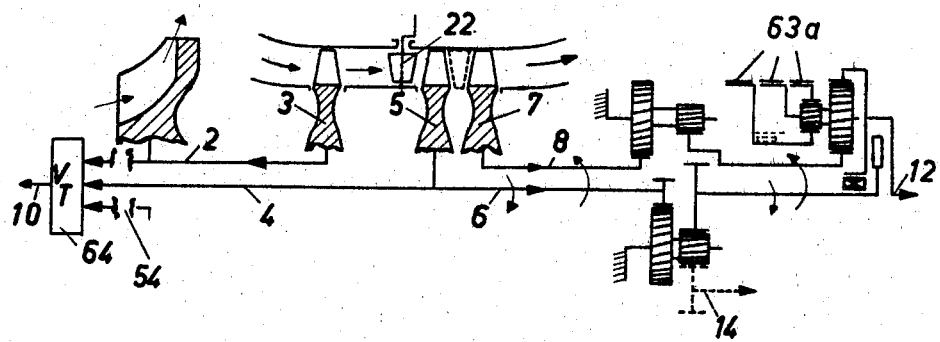

FIG. 56 shows basically the same arrangement as in FIG. 55 but provided with a variable speed transmission 64, preferably designed to operate at turbine speed without intermediate gears. The transmission can be of various types, such as electric with a generator and motor and vice versa for reversed power transmission. The electric transmission has several advantages, and among which is that of not being effected by low ambient temperatures. The variable transmission can also be of the hydrostatic type with a pump and motor and the possibility of reversing the process as above. It can also be a friction drive or a hydrodynamic drive. They can all be of a simple straight through or of a split torque mechanical type with improved efficiency and reduced size, but with reduced speed range. The choice will depend upon application and requirements. However, the system described permits a greater flexibility and adaptability to various applicatons in this respect, in which the customer can have a choice as regards this auxiliary equipment, while the basic elements remain the same. Further, the system in FIG. 56, incorporates a counterrotating turbine system, while that in FIG. 55 has a corotating system, which requires a fairly simple change of the turbine blading and the exchange of a ring gear for a sun gear in the reduction unit. FIG. 56 shows brake bands 63a instead of clutches which is mainly a matter of radical space available.

Figure 57:
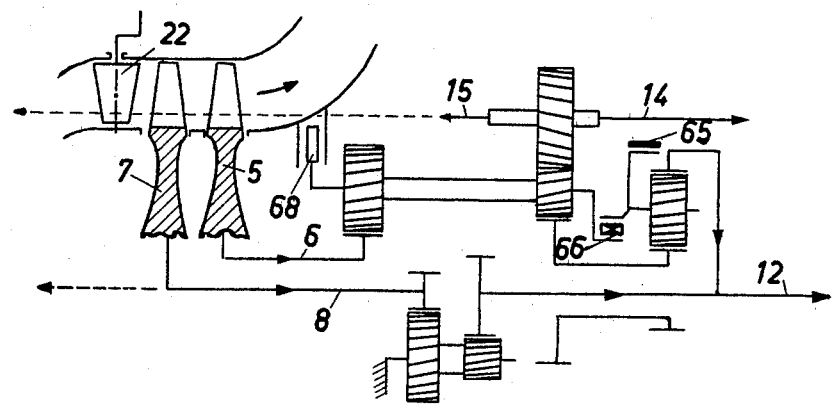
Figure 58:
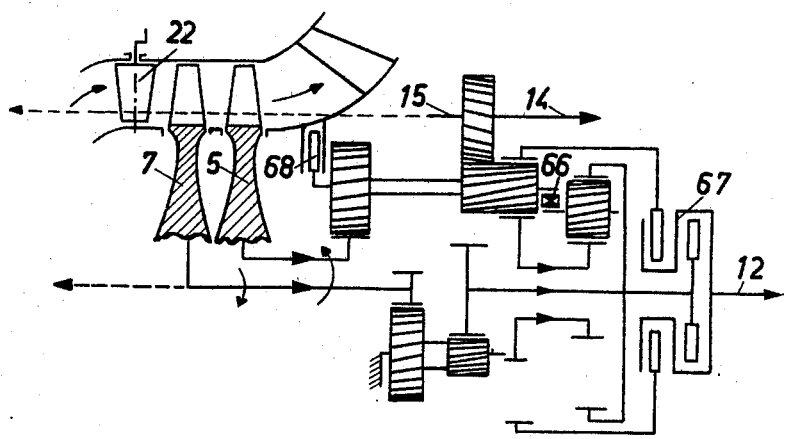

FIGS. 57 and 58 show two versions of the power turbine system similar to that in FIG. 34, but without the infinitely variable transmission and the associated gear. Aerodynamic braking can be obtained in the first case by the application of a band brake 65 to lock a free wheel 66 while in the second case aerodynamic braking can be obtained by applying both reverse and forward clutches 67.

In both cases, the variable stator system is used to increase the brake effect, as will be described in connection with FIGS. 65–70.

Both the above systems show schematically a safety device 68 against overload of the reduction and turbine system relative to shock loads from the main load or the load driven by the power takeoff.

Power turbine characteristics

The following FIGS. 59–70 describe further the characteristics and the operating principles of the power turbine system in a situation in which it operates disconnected from the gas producer rotor. In this special situation, a counterrotating turbine system without any intermediate stator system is considered.

In contrast to earlier known sysems, these systems have full power take off, a variable main power turbine stator, two range aerodynamic braking, exhaust whirl remover and low speed combining and planetary gears. This eliminates the otherwise appearing difficulties with centrifugal pinion loads, high power losses and planetary pinion wear connected with high speed planetary gears. Furthermore the auxiliary turbine has several functions as above briefly described. Some additions are described more in detail in the following with reference to the corresponding figures.

Figure 59:
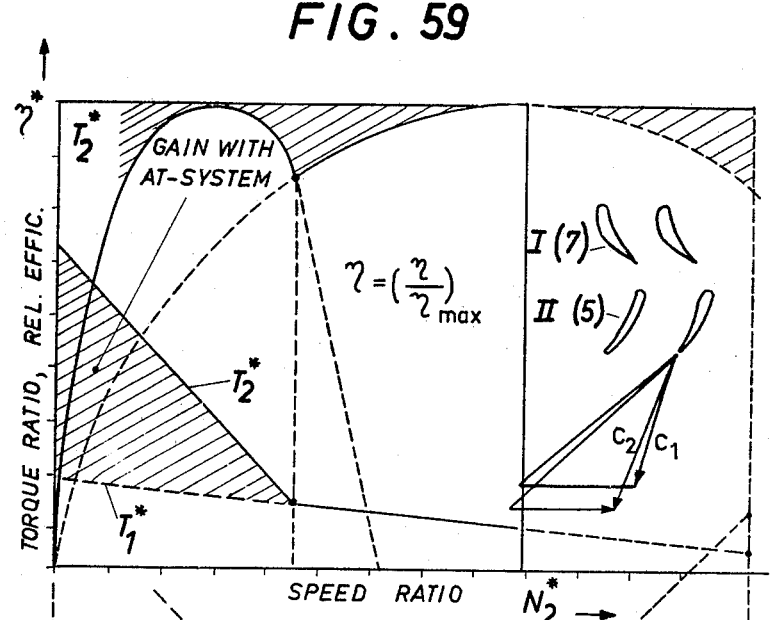
FIGS. 59–70 are diagrams further describing some of the operating characteristics, particularly with respect to the power turbine and transmission side.

FIG. 59 shows the relative torque ratio and efficiency obtained with the auxiliary turbine II (5) assisting the main turbine I (7) in the low speed range with fixed main power turbine stator and without auxiliary turbine stator or nozzle ring.

Figure 60:
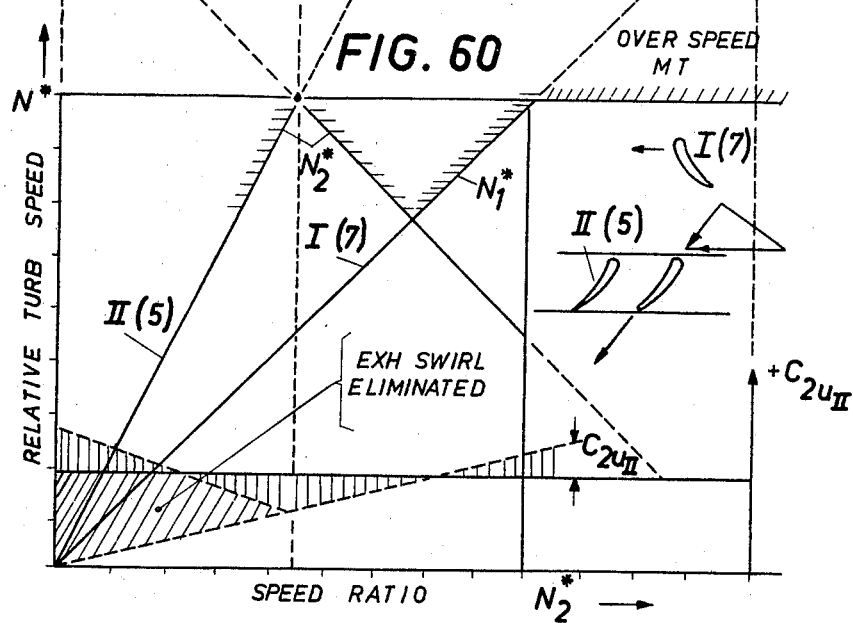

FIG. 60 shows the speed characteristics of a free auxiliary turbine II which is, in the first phase or power transmitting range, geared to and governed by a main power turbine I. In the high speed range it is automatically governed by the exhaust swirl of the main power turbine. Generally, the aerodynamic design according to the invention in this case is such that the main turbine exhaust swirl is relatively great. It is delivered directly to the auxiliary turbine, which is designed to remove or reduce the exhaust swirl. Thus, at stall (see FIGS. 65–67) the main power turbine functions as a regular stator ring for the auxiliary turbine which in its turn acts as an exhaust diffuser. It increases the pressure ratio over the main turbine and reduces the exhaust losses and hence the total pressure losses, thereby increasing the mass flow level of the whole system.

Figure 61:
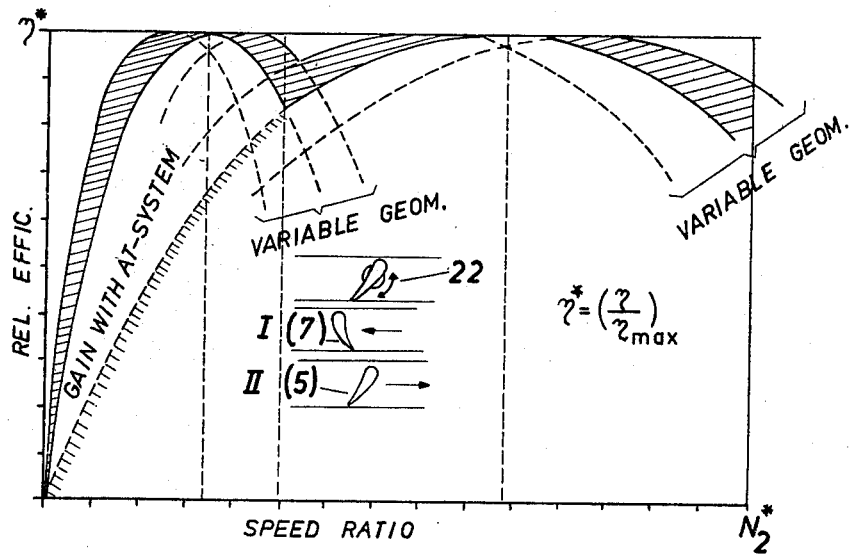
Figure 62:
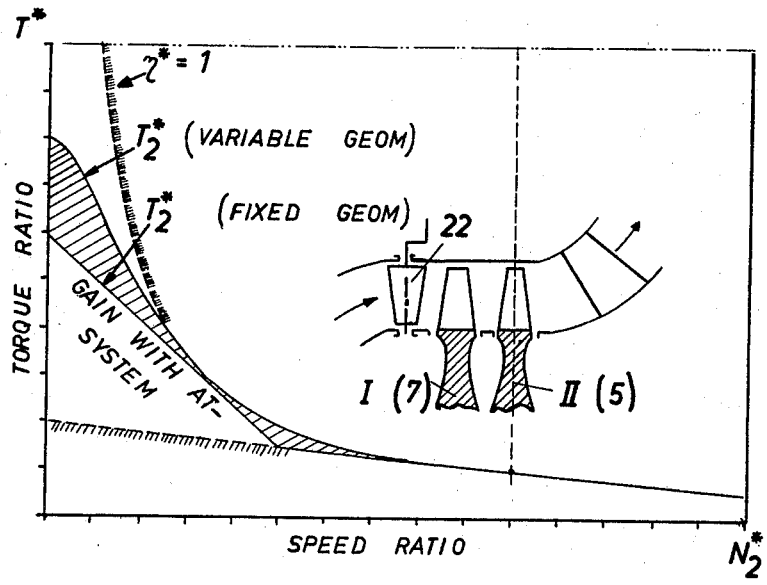

The schematic efficiency of a combined power and auxiliary turbine plant is illustrated in FIG. 61, while FIG. 62 shows the schematic torque characteristics of the turbine plant equipped with fixed and with variable geometric stators.

Figure 63:
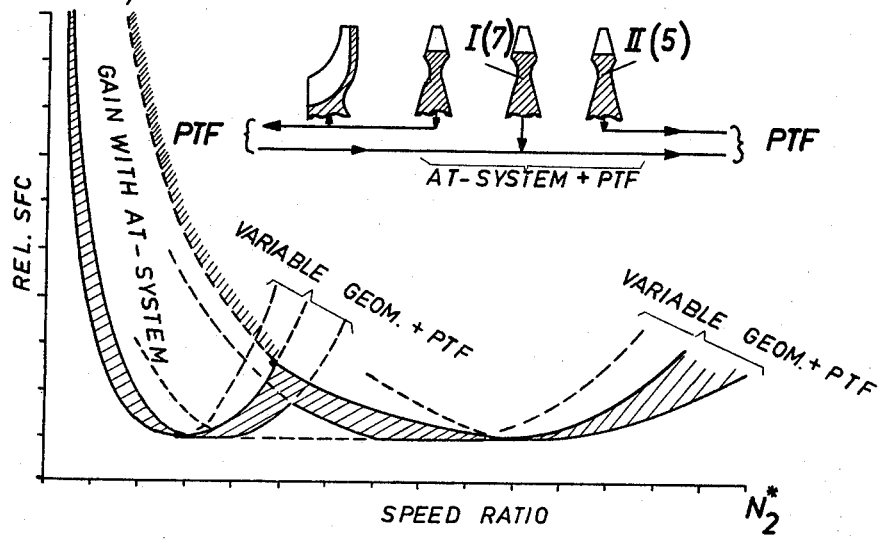
Figure 64:
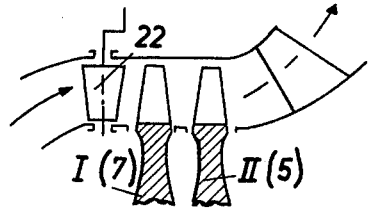

FIG. 63 illustrates the combined turbine plant as a function of the relative output speed, while FIG. 64 shows the specific fuel consumption of a turbine plant with a variable stator geometry as a function of the relative output power.

Figure 65:
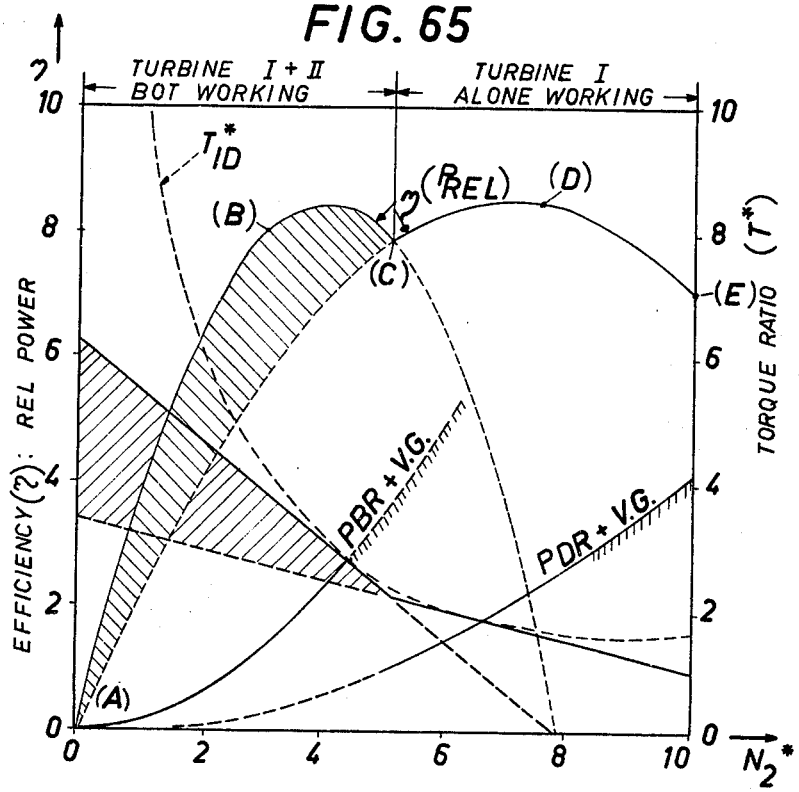

The general turbine performance for a fixed stator setting and the braking characteristic with reversed stator nozzle position and with aerodynamic reaction turbine brake, respectively, applied is illustrated in FIG. 65. The turbine and gear arrangement with a turbine related to FIG. 65 and provided with added variable stators and an aerodynamic reaction brake and power takeoff are shown in FIG. 66.

Figure 66:
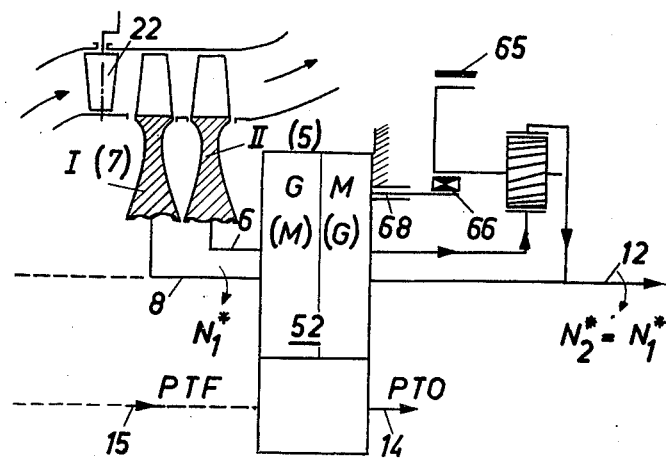

FIGS. 67–70 show turbine and planetary gear sector diagrams of the turbine of FIG. 66.

Figure 67:
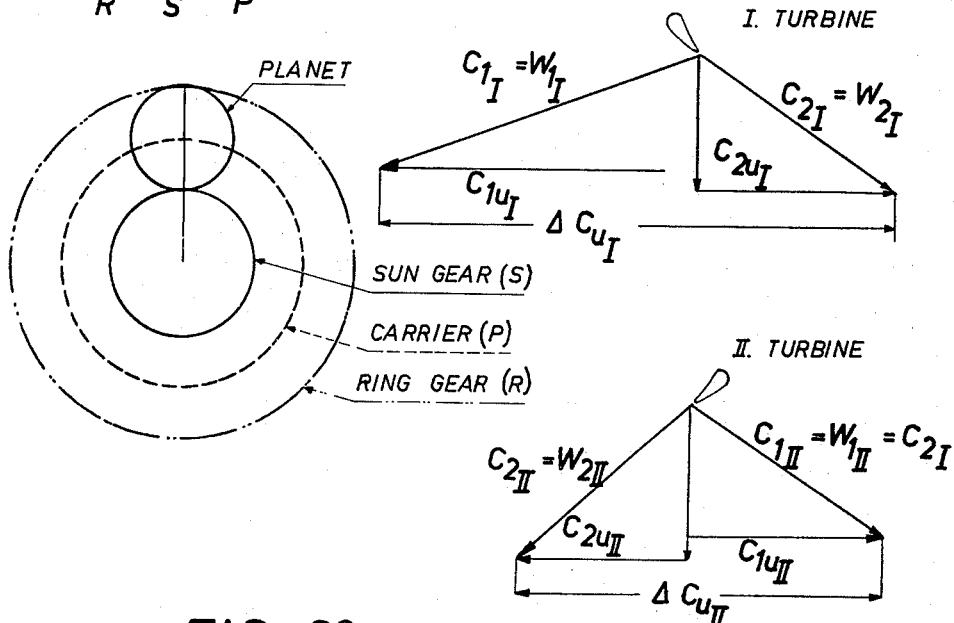
Figure 68:
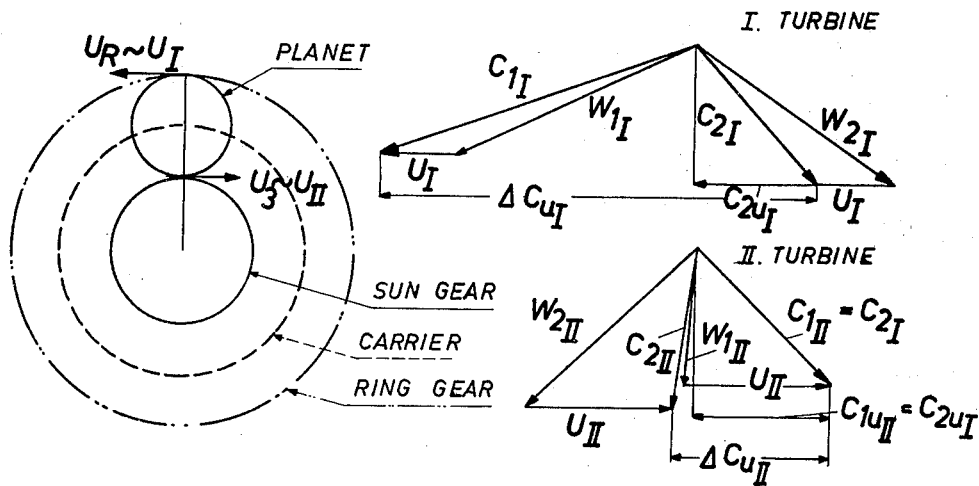
Figure 69:
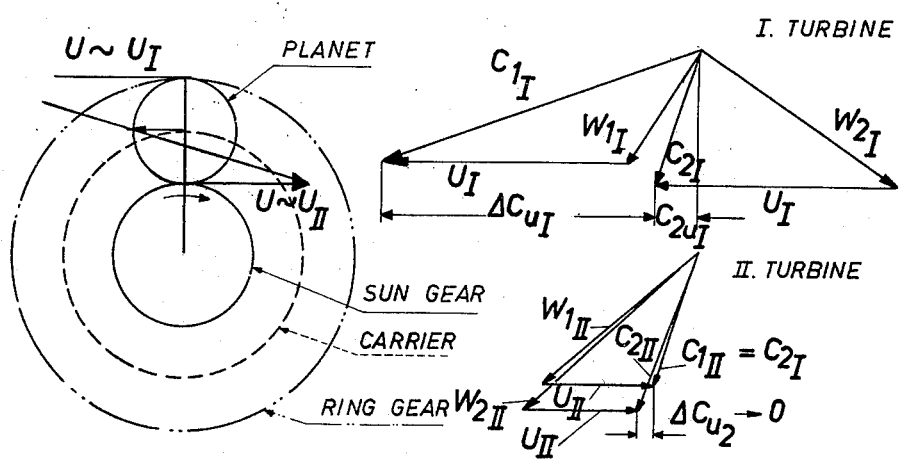
Figure 70:
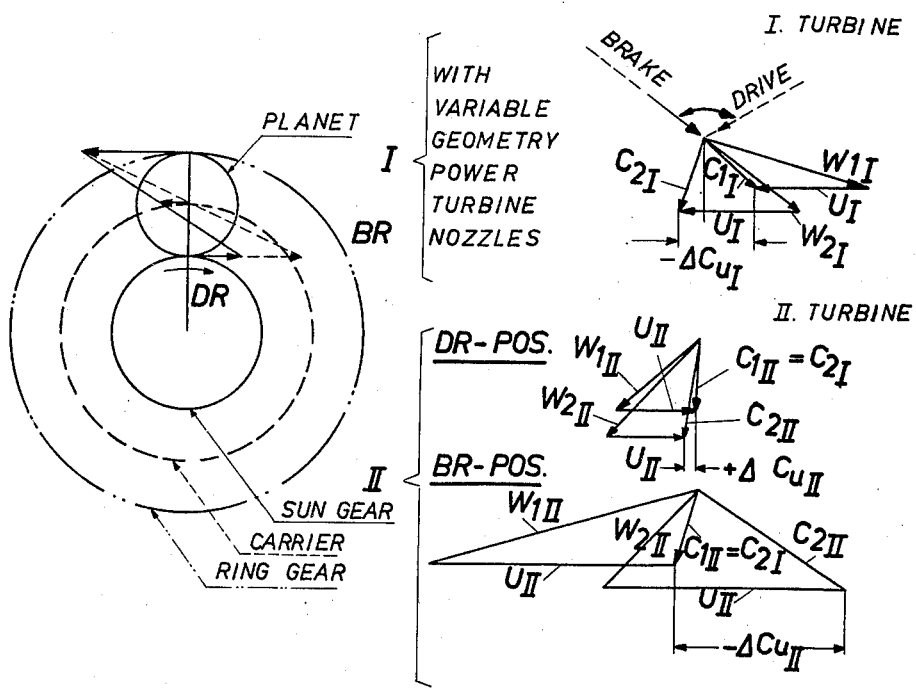

FIGS. 67 and 68 show the situation at point A (stall point) and at point B, respectively, of the first phase (both turbines operating) of FIG. 65, whereas FIG. 69 depicts the situation at point E of phase 2 (turbine I operating alone). FIG. 70 shows the situation at point C, with a variable stator in position for braking and with free reaction element (DR-pos.) and locked reaction element (BR-pos.) respectively.

The auxiliary exhaust turbine can be designed with a reduced, but still substantial reverse exhaust swirl in the opposite direction to that of the flow leaving the main power turbine. In thise case, it preferably, amounts to less than half of the last mentioned swirl and consequently to less than 25% of the energy content.

As the turbine system starts to move the load (see FIGS. 65–70) the resultant exhaust swirl is reduced and then gradually increases in the other direction, decreases again and increases in the original direction as indicated in the lower part of FIG. 60, and at all times swings around the zero value.

FIGS. 61 and 62 indicate the gain in relative efficiency and torque multiplication by the use of variable stator geometry as compared to fixed nozzle geometry in connection with the auxiliary turbine system.

FIGS. 63 and 64 illustrate the corresponding gains with respect to the specific fuel consumption (SFC) over the speed ratio respectively the power ratio with the auxiliary turbine (AT) system and variable nozzle geometry combined with mechanical-aerodynamic power transfer.

FIGS. 65–70 disclose the operation principles of the turbine system and the low speed planetary without power transfer and the "aerodynamic braking" through the power turbine system alone (FIG. 70) by the use of variable nozzle geometry with and without the reaction brake (BR) applied.

The following claims are directed to the species of FIGURE 45.

What we claim is:

1. A compact gas turbine power plant comprising a gas producer means, a common gas passage defining means from said gas producer means, a main power turbine and an auxiliary turbine, each of said turbines having a rotor arranged in said common gas passage defining means, a power takeoff means for said main power turbine, a power takeoff means at said auxiliary turbine, and power transfer means arranged for coupling at will the output of the auxiliary turbine in arbitrary proportions either to the compressor turbine of the gas producer means or to the power turbine.

2. The power plant according to claim 1, in which the power transfer means is arranged between the auxiliary turbine and the power turbine.

3. The power plant according to claim 1, including an inlet for the power turbine and a variable pitch stator arranged at said inlet.

4. The power plant according to claim 1, including an inlet for the auxiliary turbine and a variable pitch stator arranged at said inlet.

5. The power plant according to claim 1, in which said power transfer means is arranged between the auxiliary turbine and said compressor turbine.

6. The power plant according to claim 1, including concentric shafts on which the rotors of the power turbine and of the auxiliary turbine are mounted and a separate reduction gear to which each of said shafts is connected.

7. The power plant according to claim 6, in which a power transfer means between the auxiliary turbine and the power turbine comprises a free wheel.

8. A compact gas turbine power plant comprising a gas producer means, a common gas passage defining means from said gas producer means, a main power turbine and an auxiliary turbine, each of said turbines having a rotor arranged in said common gas passage defining means, a power takeoff means for said main power turbine, at least one power takeoff means separate from the power takeoff means of the power turbine to which said auxiliary turbine is operably connected and power transfer means arranged to couple the auxiliary turbine with the compressor turbine of the gas producer means between the auxiliary turbine and said compressor turbine.

9. A compact gas turbine power plant comprising a gas producer means, a common gas passage defining means from said gas producer means, a main power turbine and an auxiliary turbine, each of said turbines having a rotor arranged in said common gas passage defining means, a power takeoff means for said main power turbine, at least one power takeoff means separate from the power takeoff means of the power turbine to which said auxiliary turbine is operably connected and power transfer means being arranged to couple the auxiliary turbine to both the power turbine and the compressor turbine of the gas producer means between the auxiliary turbine and the power turbine and said compressor turbine.

10. A compact gas turbine power plant comprising a gas producer means, a common gas passage defining means from said gas producer means, a main power turbine and an auxiliary turbine, each of said turbines having a rotor arranged in said common gas passage defining means, a power takeoff means for said main power turbine, at least one power takeoff means separate from the power takeoff means of the power turbine to which said auxiliary turbine is operably connected, an inlet for each of sad turbines and a variable pitch stator arranged at the inlet of the power turbine and the inlet of the auxiliary turbine.

11. A compact gas turbine power plant comprising a gas producer means, a common gas passage defining means from said gas producer means, a main power turbine and an auxiliary turbine, each of said turbines having a rotor arranged in said common gas passage defining means, a power takeoff means for said main power turbine, at least one power takeoff means separate from the power takeoff means of the power turbine to which said auxiliary turbine is operably connected, concentric shafts on which the rotors of the power turbine and of the auxiliary turbine are mounted, a separate reduction gear to which each of said shafts is connected, and said concentric shafts being arranged to rotate in opposite directions, with the auxiliary turbine, and its pertaining power takeoff being connected to a main power drive line by a free wheel engaging the main power drive line following a direction changing reduction gear wheel therein, and clutch means arranged to effect forward or reverse drive to connect at will the auxiliary power takeoff to the main power takeoff.

12. A compact gas turbine power plant comprising a power producer means, a common gas passage defining means from said gas producer means, a main power turbine and an auxiliary turbine, each of said turbines having a rotor arranged in said common gas passage defining means, a power takeoff means for said main power turbine, at least one power takeoff means separate from the power takeoff means of the power turbine to which said auxiliary turbine is operably connected, concentric shafts on which the rotors of the power turbine and of the auxiliary turbine are mounted, a separate reduction gear to which each of said shafts is connected, power transfer means between the auxiliary turbine and the power turbine being defined by a free wheel, and the reduction gear connected to the outer shaft containing a ring gear enclosing the reduction gear connected to the inner shaft.

References Cited

UNITED STATES PATENTS

| | | | |
|---|---|---|---|
| 2,482,791 | 9/1949 | Nettel et al. | 60—39.16 X |
| 2,802,334 | 8/1957 | Fletcher et al. | 60—39.16 |
| 2,852,912 | 9/1958 | Kelley | 60—39.16 |
| 2,981,063 | 4/1961 | Wickman | 60—39.16 |
| 3,037,348 | 6/1962 | Gassmann | 60—39.16 |
| 3,038,307 | 6/1962 | Oprecht | 60—39.16 |
| 3,290,878 | 12/1966 | Wickman | 60—37.16 |
| 2,931,173 | 4/1960 | Schapker | 60—39.16 |
| 3,154,918 | 11/1964 | Kronogard | 60—39.16 |
| 3,423,048 | 1/1969 | Clarke et al. | 60—39.16 |

CARLTON R. CROYLE, Primary Examiner

A. D. HERRMANN, Assistant Examiner

U.S. Cl. X.R.

74—665; 180—66